(12) United States Patent
Schmidt et al.

(10) Patent No.: US 11,401,093 B2
(45) Date of Patent: Aug. 2, 2022

(54) GROUPED SCREW BUNCH AND RELATED METHOD AND MACHINE FOR PRODUCTION OF THE SAME

(71) Applicant: THE HILLMAN GROUP, INC., Cincinnati, OH (US)

(72) Inventors: Michael J. Schmidt, Gilbert, AZ (US); Byron K. Grice, Phoenix, AZ (US); Brian D. Rosner, Phoenix, AZ (US); Jordan D. Shoenhair, Scottsdale, AZ (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 35 days.

(21) Appl. No.: 16/838,287

(22) Filed: Apr. 2, 2020

(65) Prior Publication Data
US 2020/0317416 A1  Oct. 8, 2020

Related U.S. Application Data

(60) Provisional application No. 62/829,230, filed on Apr. 4, 2019.

(51) Int. Cl.
*B65D 71/08* (2006.01)
*B65B 13/02* (2006.01)
*B65D 63/10* (2006.01)
*F16B 33/00* (2006.01)

(52) U.S. Cl.
CPC .............. *B65D 71/08* (2013.01); *B65B 13/02* (2013.01); *B65D 63/10* (2013.01); *F16B 33/00* (2013.01)

(58) Field of Classification Search
CPC .......... B65D 71/08; B65D 63/10; B65B 13/02
USPC .................................. 206/338, 340, 344, 345
See application file for complete search history.

(56) References Cited

U.S. PATENT DOCUMENTS

| | | | |
|---|---|---|---|
| 2,590,358 A | 3/1952 | Williams | |
| 2,909,781 A | 10/1959 | Ollig | |
| 2,976,592 A | 3/1961 | Christin | |
| 3,037,620 A * | 6/1962 | Douty | B65D 71/08 206/342 |
| 3,082,425 A | 3/1963 | Leslie | |
| 3,083,369 A * | 4/1963 | Peterson | F16B 15/08 206/345 |
| 3,587,842 A * | 6/1971 | Keck | F16B 15/08 206/345 |
| 3,861,527 A * | 1/1975 | Perkins | F16B 15/02 206/344 |
| 3,967,727 A | 7/1976 | Jakesch | |

(Continued)

*Primary Examiner* — Rafael A Ortiz
(74) *Attorney, Agent, or Firm* — Thompson Hine LLP

(57) ABSTRACT

A screw bunch includes a plurality of screws grouped together in a bunch with the enlarged head end of each screw toward a first end of the bunch and the pointed tip end of each screw toward a second end of the bunch. The screws are held together in the bunch by a band structure that extends around the bunch and that engages with the shanks of a multiplicity of the screws that are located along a perimeter of the bunch. The enlarged head ends of the screws are axially staggered. The band structure may be formed by a shrink wrap plastic band that can be separated from the bunch manually to enable individual retrieval of screws from the bunch for use. A method and machinery for production of the screw bunch is also provided.

7 Claims, 27 Drawing Sheets

(56) References Cited

U.S. PATENT DOCUMENTS

| | | | | |
|---|---|---|---|---|
| 4,712,676 A | * | 12/1987 | Randall | B65D 85/24 |
| | | | | 206/338 |
| 5,020,663 A | * | 6/1991 | Dallas | B65D 5/725 |
| | | | | 229/122 |
| 5,194,408 A | * | 3/1993 | Stamp | B65D 81/3446 |
| | | | | 426/234 |
| 6,082,536 A | | 7/2000 | Ito | |
| 2012/0160713 A1 | * | 6/2012 | Bonelli | B65D 71/0085 |
| | | | | 206/139 |
| 2013/0086794 A1 | | 4/2013 | Bond | |
| 2014/0231493 A1 | * | 8/2014 | Andersen | B65D 71/08 |
| | | | | 229/87.05 |

* cited by examiner

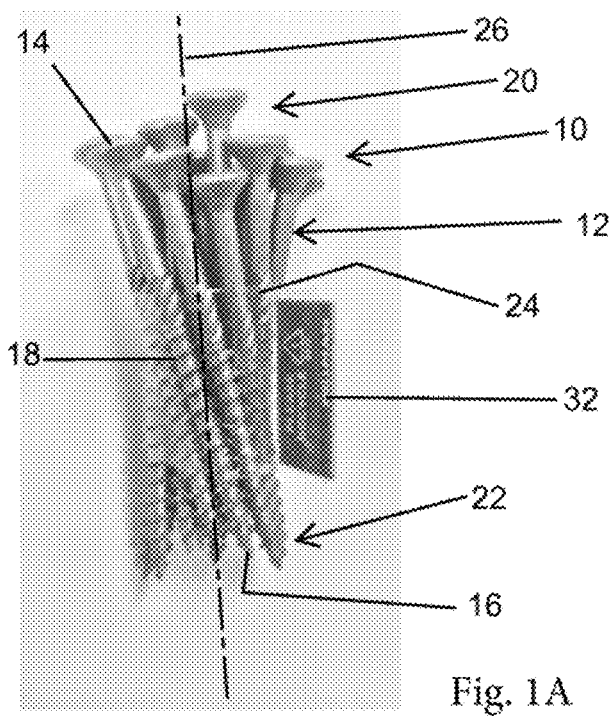
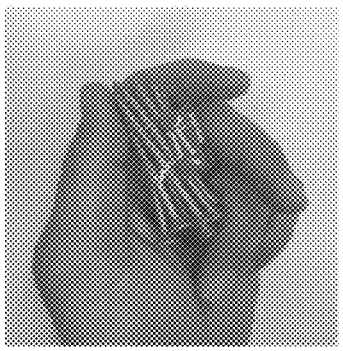
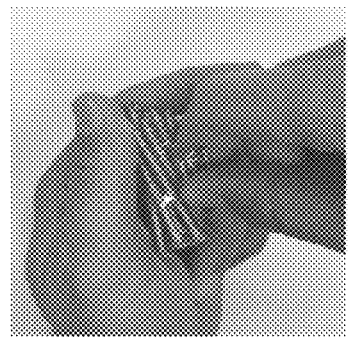
Fig. 1A
Fig. 1B
Fig. 1C
Fig. 1D

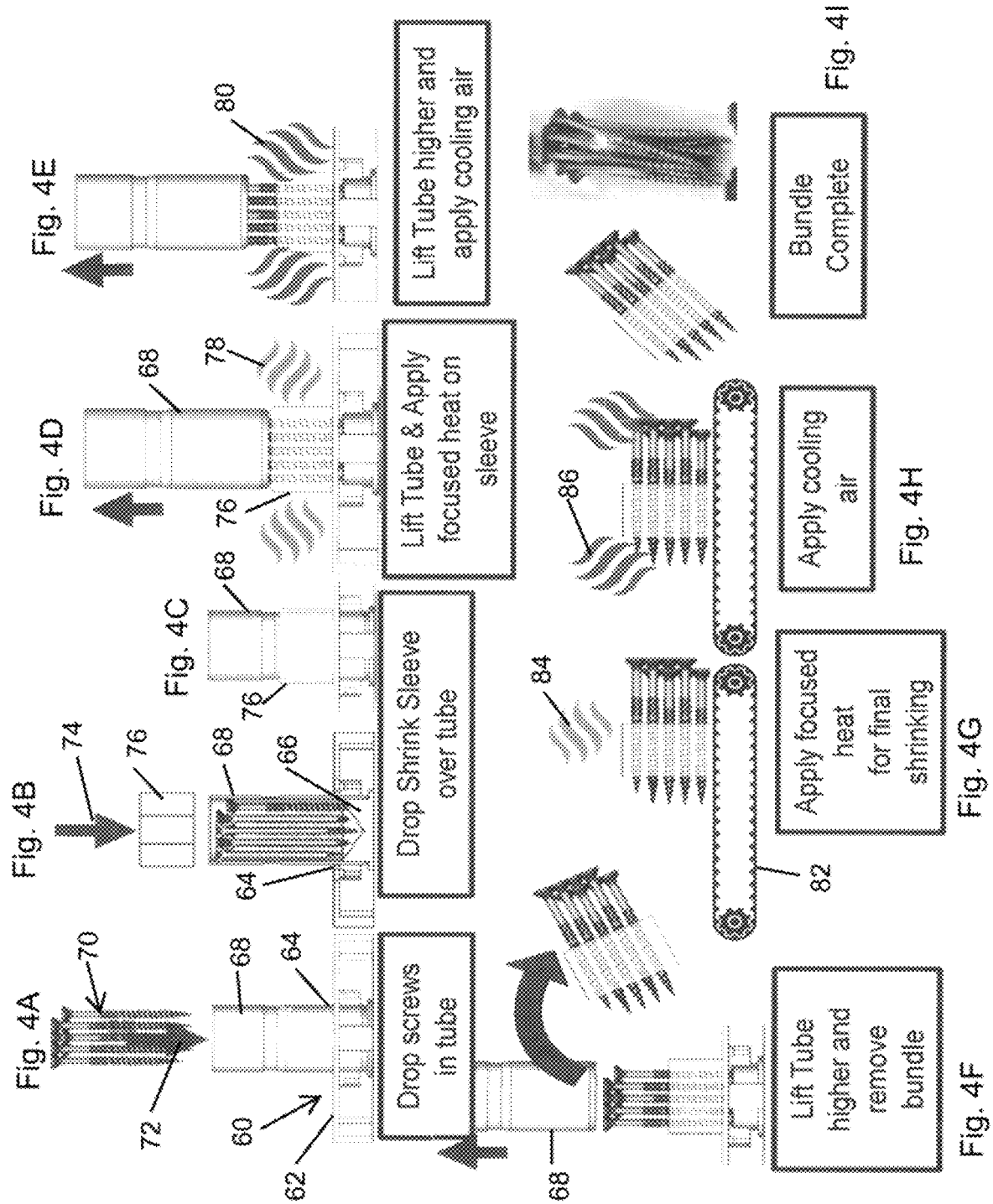

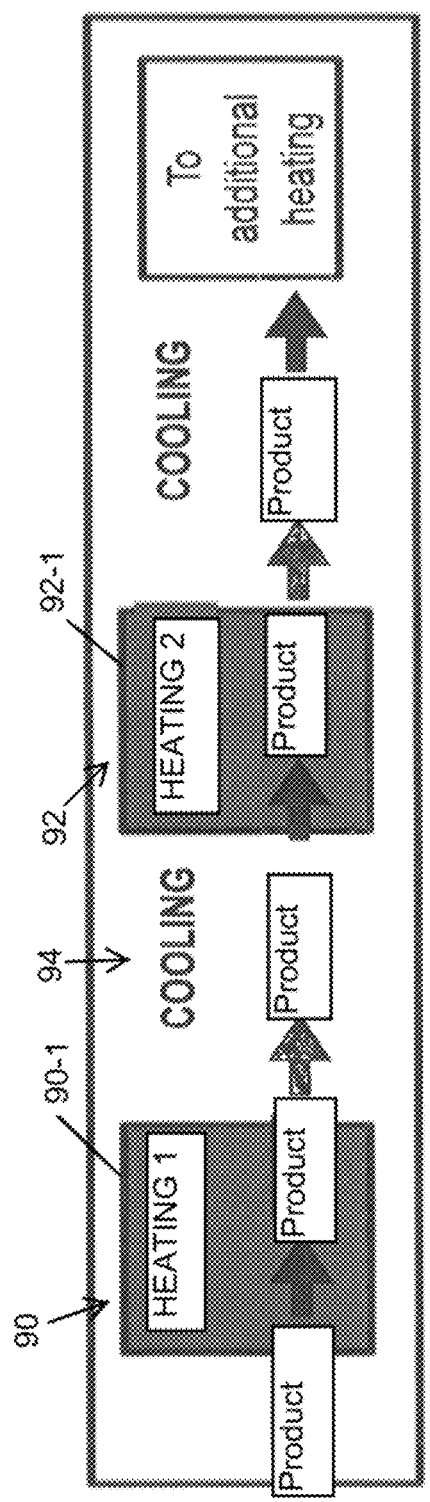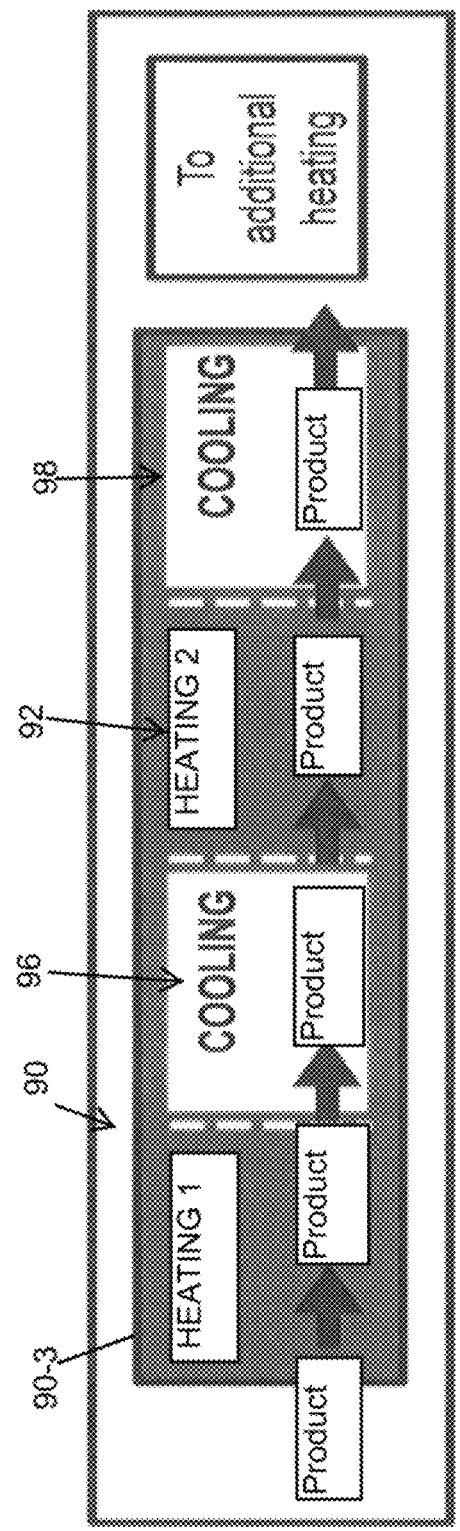
Fig. 5A
Fig. 5B

GROUPED SCREW BUNCH AND RELATED METHOD AND MACHINE FOR PRODUCTION OF THE SAME

TECHNICAL FIELD

This application relates generally to screws utilized by builders for general construction and, more specifically, to a grouped screw bunch that facilitates handling and use of the screws.

BACKGROUND

Builders commonly use bulk screws for various projects. The contractors typically fill a work-belt pouch with screws from a bulk screw source (e.g., a bucket or bin) and then occasionally grab hand-size bunches of screws from the pouch when working. The problem with this system is that the bulk screws in the pouch tend to become oriented in multiple directions and it is difficult to remove a hand-size bunch of screws from the pouch without dropping some or without at least taking time to orient all of the screws in the same direction, which reduces productivity and is also frustrating for the worker.

It would be desirable to provide a solution that addresses the above issue(s).

SUMMARY

In one aspect, a screw bunch includes a plurality of screws, each screw having an enlarged head end, a pointed tip end and shank extending between the enlarged head end and the pointed tip end, the shank being at least partially threaded. The plurality of screws are grouped together in a bunch with the enlarged head end of each screw toward a first end of the bunch and the pointed tip end of each screw toward a second end of the bunch. The plurality of screws are held together in the bunch by a band structure that extends around the bunch and that engages with the shanks of a multiplicity of the screws that are located along a perimeter of the bunch. The enlarged head ends of the plurality of the screws are axially staggered, such that a head end perimeter dimension of the bunch is smaller than would be the case if the head ends were not axially staggered. The band structure comprises a shrink wrap plastic band that can be separated from the bunch manually to enable individual retrieval of screws from the bunch for use.

In another aspect, a screw bunch includes a plurality of screws, each screw having an enlarged head end, a pointed tip end and shank extending between the enlarged head end and the pointed tip end, the shank being at least partially threaded. The plurality of screws are grouped together in a bunch having an elongated axis, wherein the enlarged head end of each screw toward a first end of the bunch and the pointed tip end of each screw toward a second end of the bunch. The plurality of screws are held together in the bunch by a band structure that extends around the bunch and that engages with the shanks of a multiplicity of the screws that are located along a perimeter of the bunch. The enlarged head ends of the plurality of screws are axially staggered, such that the enlarged head ends of multiple screws overlap in an end view along the elongated axis and such that a head end perimeter dimension of the bunch is smaller than would be the case if the head ends were not axially staggered.

In a further aspect, a method of producing a screw bunch involves: positioning a plurality of screws in a set with head ends of the screws commonly oriented toward one axial end of the set and with the head ends having axially staggered positions relative to each other; positioning a band member about the set of screws; and tightening the band member about the set of screws causing the set to collapse inwardly toward a central axis of the set.

In yet another aspect, a method of producing a screw bunch involves: separating a plurality of screws into a plurality of screw sets, each screw set including a common number of screws; dropping one screw set into a tubular member; applying a shrink sleeve member around the tubular member; moving the tubular member to a raised position to expose the one screw set, such that the tubular member is no longer positioned between the shrink sleeve member and the one screw set, wherein, in the first raised position, the tubular member surrounds an upper end of the one screw set; applying heat to the shrink sleeve member while the tubular member is in the raised position, causing the shrink sleeve member to shrink into holding contact with the one screw set to form a wrapped screw bunch; cooling the shrink sleeve member; and moving the tubular member to a further raised position that is higher than the first raised position, such that the wrapped screw bunch is no longer surrounded by the tubular member and can be removed from the loading station.

In still another aspect, a machine for producing wrapped screw bunches includes a turntable including a plurality of screw load stations, the turntable rotatable about a first rotation axis, each screw load station including an associated tubular member and an associated tube lifter. A carousel includes a plurality of downwardly sloped screw channels for supporting groups of screws, the carousel rotatable about a second rotation axis, the carousel surrounded by a stationary wall having an outlet gate that is selectively alignable with an outfeed end of each screw channel based upon rotational position of the carousel. A curved feed track running downwardly from the outlet gate such that screws can slide downward along the feed track, the feed track having an outlet end. A drop funnel has a support track with an inlet end that is aligned with the outlet end of the feed track, the support track formed in part by a wall of the drop funnel and in part by a movable gate of the drop funnel, the drop funnel including a bottom opening. Each screw load station is rotatable along a path that includes a position below the bottom opening so that a group of screws can be dropped into the tubular member of the load station to form a loaded tube.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1A-1F show images for one embodiment of a wrapped screw bunch;

FIGS. 4A-4I shows a sequence of forming a wrapped screw bunch;

FIGS. 5A-5B depict heating/cooling sequences;

DETAILED DESCRIPTION

Figure 1E:
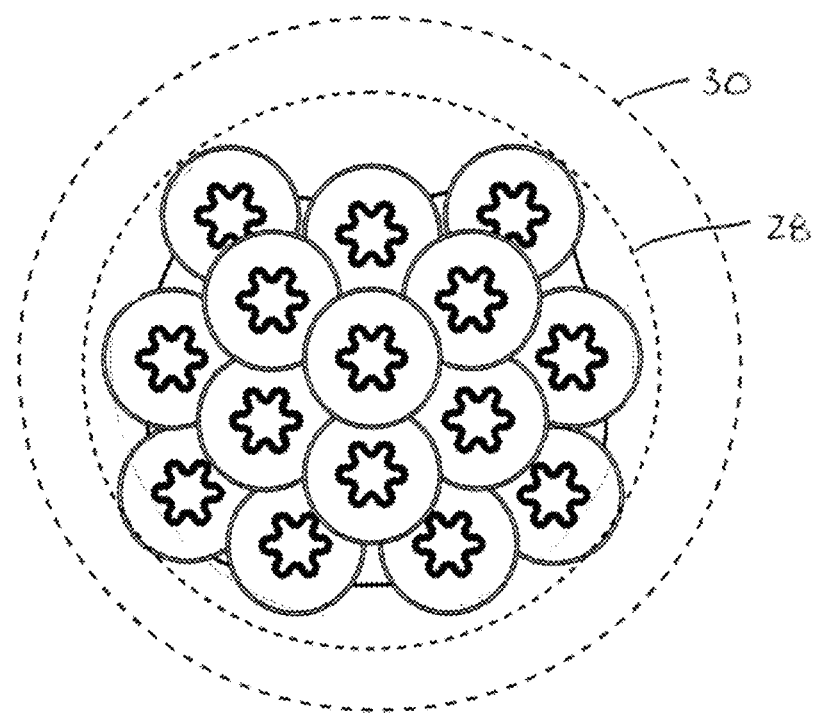

Referring to FIGS. 1A-1E, one embodiment of a wrapped screw bunch 10 is shown. The screw bunch is formed by a plurality of screws 12, where each screw has an enlarged head end 14, a pointed tip end 16 and a shank 18 extending between the enlarged head end and the pointed tip end, with the shank being at least partially threaded. The plurality screws are grouped together in a handhold sized bunch, with the enlarged head end of each screw toward a first end 20 of the bunch and the pointed tip end of each screw toward a second end 22 of the bunch. By way of example, a typical bunch may be formed by between ten and fifteen screws, though the number can vary based upon factors such as screw type and screw size.

Figure 1F:
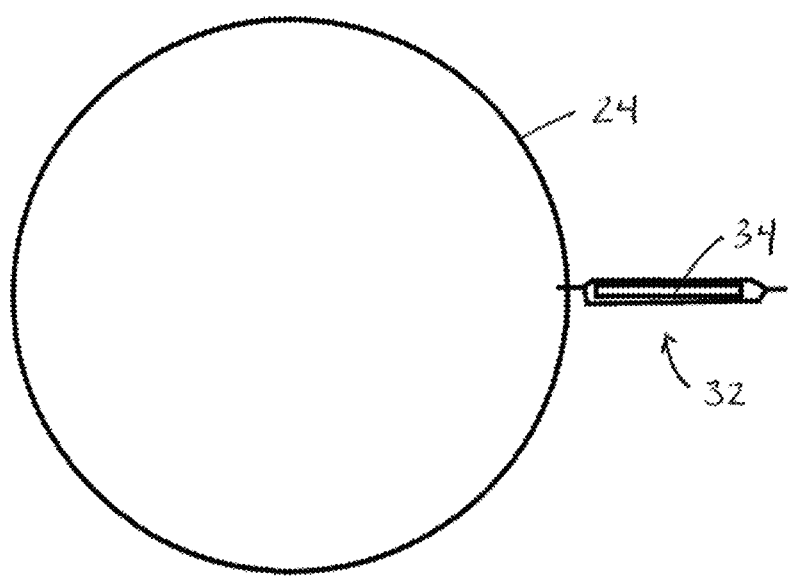

As shown, the enlarged head ends 14 of the screws 12 are axially staggered (e.g., the axial position of the head ends 14 relative to an overall central axis 26 of the screw bunch varies). This axial staggering of the head ends 14 results in a configuration in which a head end perimeter dimension of the bunch is smaller than would be the case if the head ends were not axially staggered. In particular, a projected circular perimeter dimension of the head end of the staggered bunch 10 from a view looking along the axis 26, which is represented by a dashed line 28 in FIG. 1E, is smaller than the comparable circular perimeter dimension for a non-staggered bunch having the same number of screws, which is represented by a dashed line 30 in FIG. 1F. In addition, as also shown in FIG. 1E, the enlarged head ends of multiple screws overlap in an end view along the elongated axis. Typically, groups of three or more (e.g., four or more) screws will have head ends that overlap in the end view.

The screws are held together in the bunch by a band structure 24 that extends around the bunch and engages with the shanks of the screws that are located along a perimeter of the bunch (e.g., any screws that are only in the center of the bunch would not be engaged directly by the band structure). Here, the band structure 24 is formed by a shrink wrap plastic band that can be separated from the bunch manually to enable individual retrieval of screws 12 from the bunch for use. However, in other embodiments, different band structures may be used, such as elastic bands, adhesive bands, biodegradable bands or bands of the twist tie or zip tie type. FIGS. 1B-1C depict exemplary band separation where the shrink wrap plastic band includes a tear wrap tab 32 extending from the screw bunch such that the tear wrap tab 32 can be manually gripped for tearing the shrink wrap plastic band away from the screw bunch as shown. The tab 32 may be formed by a sheet member 34 that around which a portion of the shrink wrap plastic is shrunk to retain the sheet member. By way of example, the sheet member 34 may be a cardboard panel or a plastic panel. Notably, the shrink wrap plastic band may also include one or more perforation lines to help facilitate band separation.

FIGS. 2A-2E depict another example of a wrapped screw bunch 40 with multiple screws 42 in a shrink wrap plastic band 44 that lacks any tear tab. In this case, the band 44 includes perforations 46 that create one or more separation lines 45 to aid in separation of the band by pulling laterally on the end of one of the screws 42 to apply sufficient force to the band 44, causing it to split along the separation line as shown.

Figure 2A:
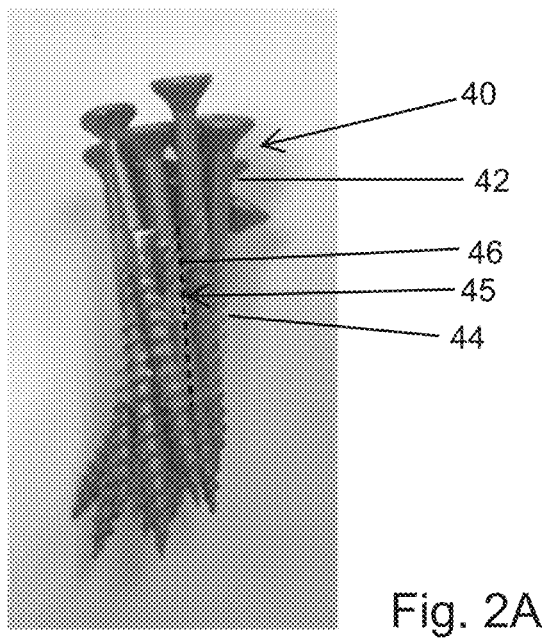
FIGS. 2A-2E show images of another embodiment of a wrapped screw bunch.
Figure 2B:
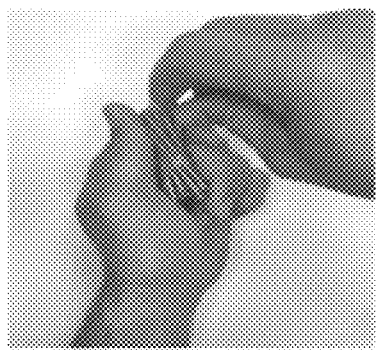
Figure 2C:
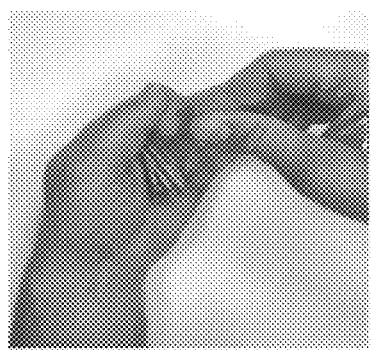
Figure 2D:
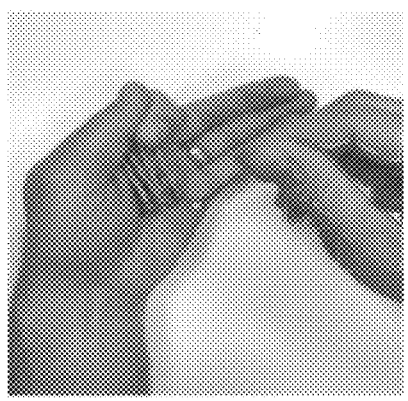
Figure 2E:
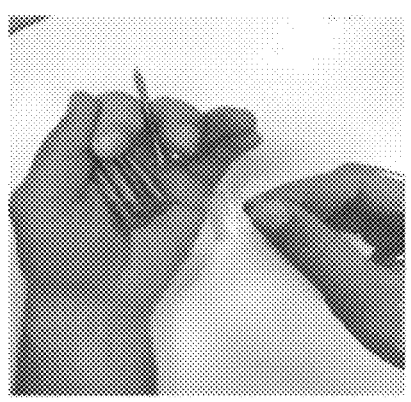
Figure 2F:
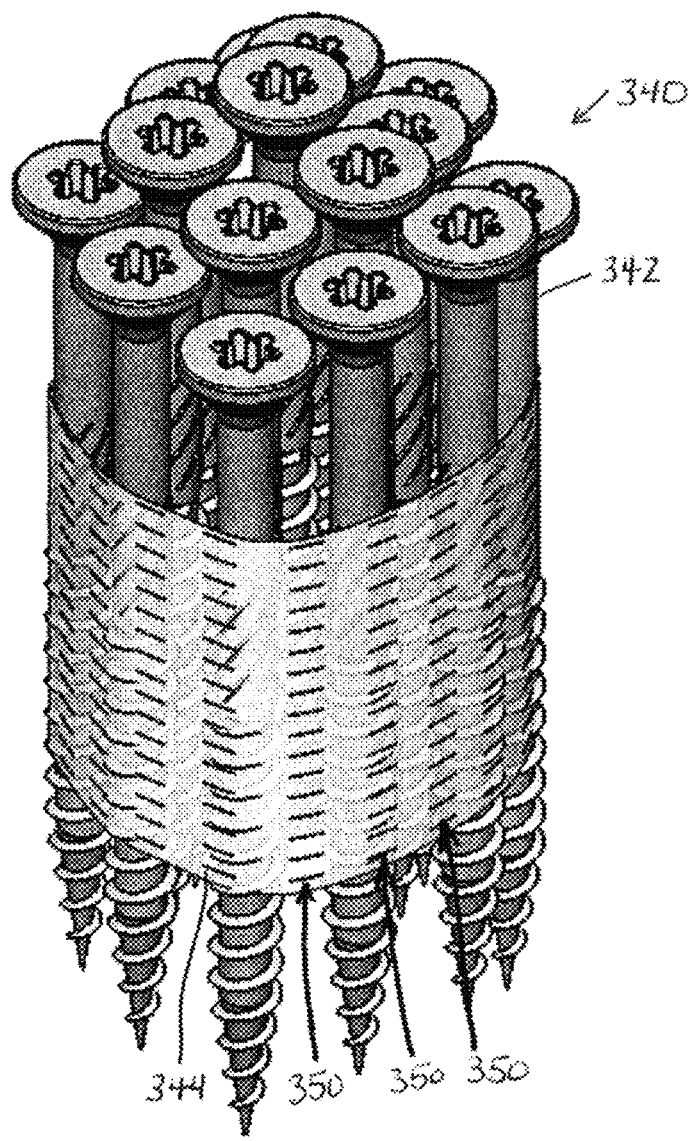
FIGS. 2F and 2G show images of another embodiment of a wrapped screw bunch.
Figure 2G:
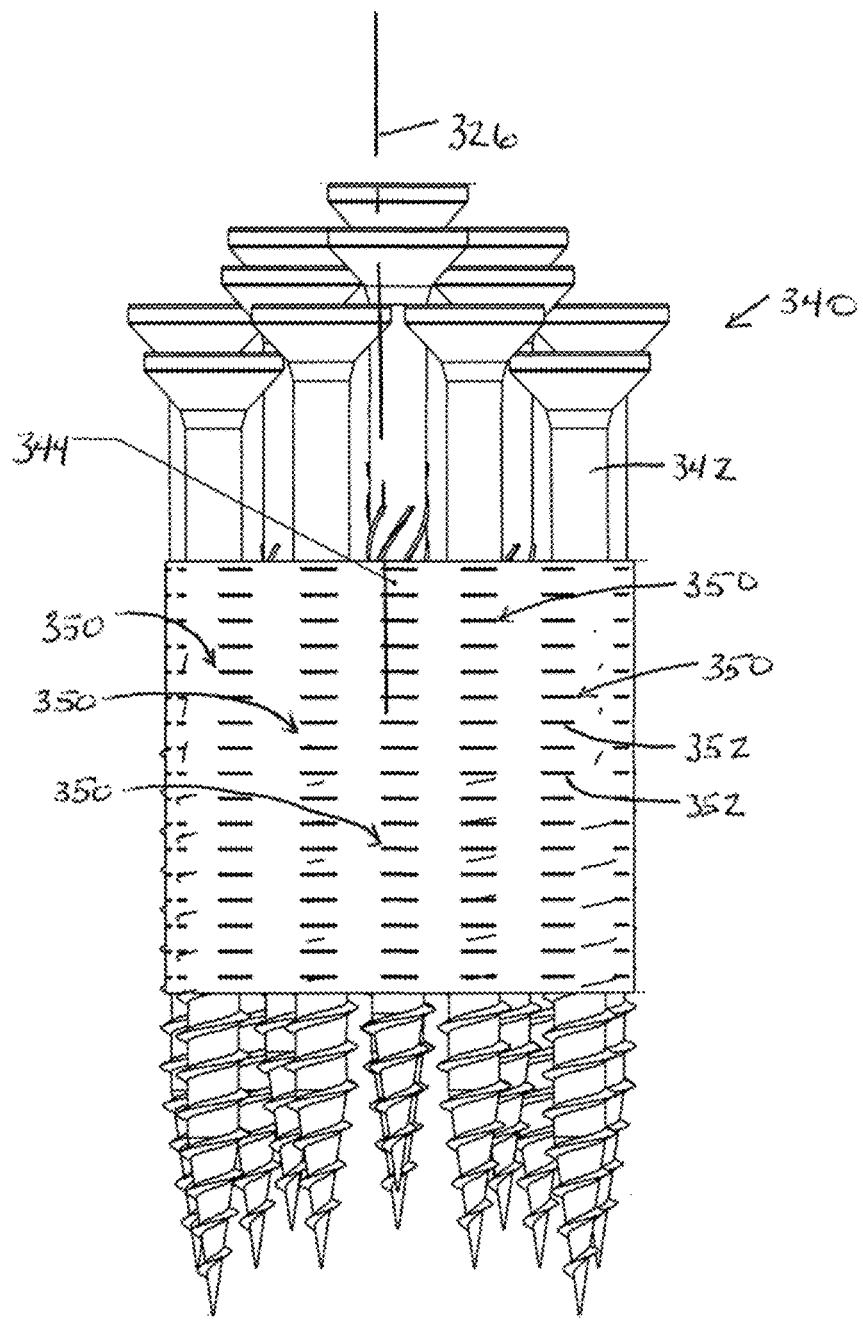

FIGS. 2F and 2G depict another example of a wrapped screw bunch 340 with multiple screws 342 in a shrink wrap plastic band 344 that lacks any tear tab. Here the band 344 includes multiple separation zones 350, each of which runs from top to bottom of the band. Each separation zone 350 is made up of a series of lateral perforations 352 (elongated slot perforations) spaced apart (e.g., equally) along the height of the band 344 and thus spaced apart along a lengthwise axis 326 of the screw bunch. The separation zones 350 are also spaced apart (e.g., equally) around the perimeter of the band 344 (e.g., the full perimeter). The lateral slot perforations have been found to provide adequate resistance against inadvertent splitting of the band (e.g., splitting of the band when the screw bunch is in transport or if the screw bunch is dropped) while still allowing splitting under used circumstances in which a person grips one of the screws and pulls it against the band. The inclusion of multiple separation zones around the periphery of the band 344 is advantageous in assuring that a person can separate the band by pulling a screw against the band in any position (e.g., regardless of the rotational position of the screw bunch within the person's hand). In this regard, it is generally desirable to include at least six distinct separation zones around the periphery of the band, such as at least eight distinct separation zones or at least ten distinct separation zones.

In the case of bunch 10 or bunch 40 or bunch 340, the shrink wrap material can be shrunk enough to assure that some of the plastic film material moves down into the spaces between threads on the shanks of the perimeter screws, which assures that the band will not simply fall off of the bunch. In addition, contact between the respective threads of the screws in the bunch, caused by the screws being squeezed together by the shrink wrap plastic band, helps to prevent relative axial sliding of the screws, which prevents the screws from simply falling out of the bunch.

In the illustrated embodiments, the band structures 24, 44, 344 are located along a region of the screws that is spaced from both the pointed ends of the screws and the enlarged head ends of the screws. In some implementations, this configuration will result in a bundle in which a smallest perimeter dimension of the bundles is along an axial region that is aligned with part of the band structure.

Figure 3A:
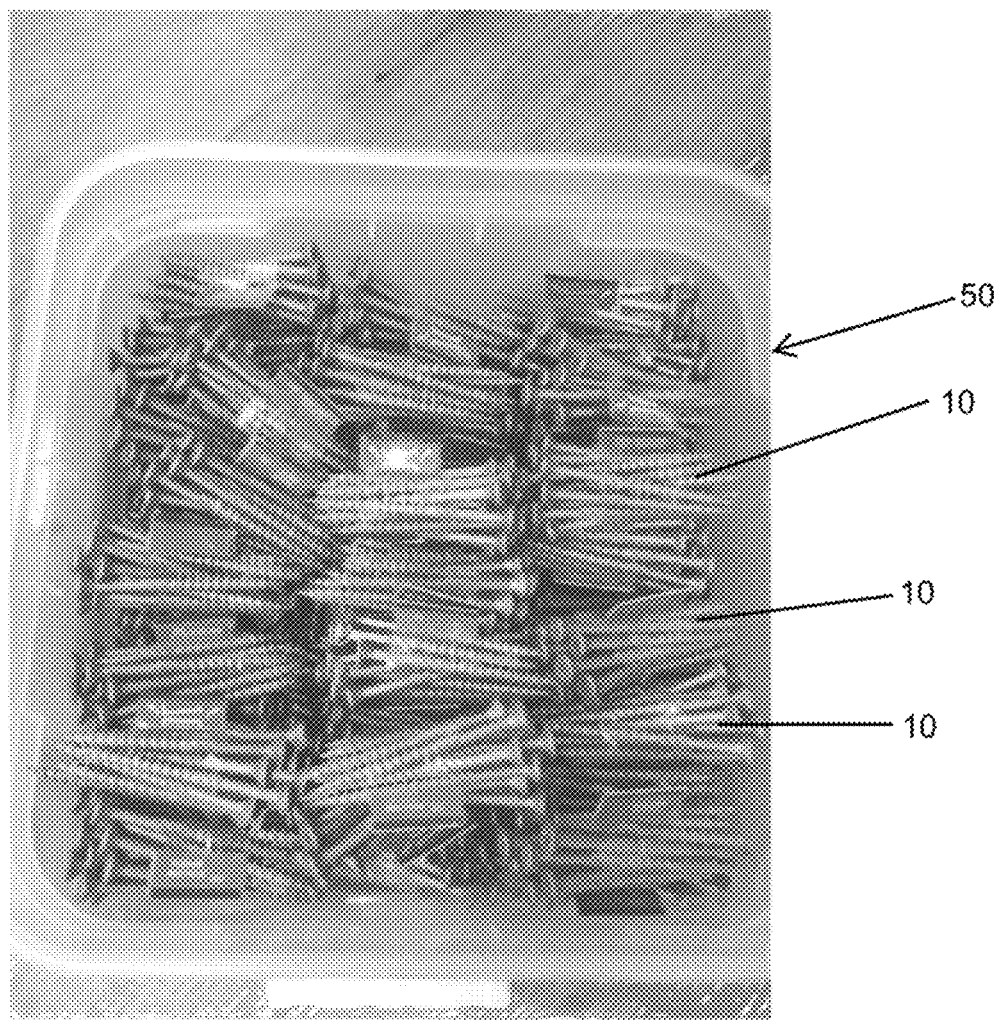
FIGS. 3A-3B show a package assembly of multiple wrapped screw bunches.
Figure 3B:
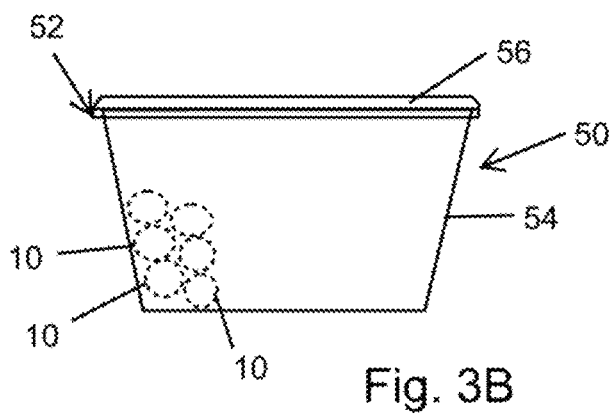

FIGS. 3A and 3B depict an exemplary screw package assembly 50 formed by a container 52 in which a plurality of screw bunches 10 are placed. The illustrated container 52 is in the form of a rectangular tub, box or bucket (e.g., a tub body 54 with a removable lid 56).

Using exemplary screw bundles packaged as shown, a typical worker would remove a number of the wrapped bunches from the tub, place those bunches in the pouch of work belt, remove one or more bunches from the pouch, remove the wrap from at least one bunch and selectively pull each screw from the bundle for install. This process or sequence assures that all screws will be immediately oriented properly in the workers hand without any fumbling or dropping of screws.

Referring now to FIGS. 4A-4I, a schematic diagram sequencing production of a wrapped screw bunch is shown, and contemplates use of a loading station 60 that includes a support frame 62 with a top opening 64 and a screw support hub 66 that aligns with the top opening and positioned within the frame interior. The loading station also includes a tubular member 68 that is movable between a lowered position seated down into the support frame 62 and disposed around the screw support hub, and multiple raised positions in which the tubular member is spaced above the support frame 62. To produce a wrapped screw bunch, a plurality of screws 12 are separated into a plurality of screw sets or groups 70 (only one set shown), where each screw set or group includes a common number of screws (e.g., 12 or 15 or other number). The loading station 60, with tubular member 68 in its lowered position, is positioned in alignment with a drop path 72 of the screw set per FIG. 4A, and the screw set is then dropped into the tubular member per FIG. 4B. Notably, the upwardly facing support surface of the screw support hub 66 is non-planar, which helps to create the above mentioned axial staggering of the screw heads. In the illustrated embodiment, the support surface is conical, but other variations are possible. In addition, the lower end of the tubular member 68 surrounds and cooperates with the upwardly projection portion of the screw support hub 66 and/or cooperates with the opening 64 in the support frame to help maintain the tubular member in an axially upright position.

The loading station 60 is positioned such that a feed path 74 of a shrink wrap plastic band 76, also commonly referred to a shrink sleeve band, will cause the plastic band to be applied around the tubular member, resulting in the configuration of FIG. 4C. The tubular member 68 can then be lifted a first raised position (per FIG. 4D) to expose the screw set 70, such that the tubular member 68 is no longer positioned between the shrink sleeve band 76 and the screw set. In this position, the lower end of the tubular member 68 still surrounds an upper end of the screw set in order to maintain the upright orientation of the screw set. Heat 78 is then applied to the shrink sleeve band 76 while the tubular member is raised (e.g., by moving the loading station through a heat shrink tunnel with heating elements), causing the shrink sleeve to shrink into holding contact with the screw set to form a wrapped screw bunch. The tubular member is then lifted to a second raised position (per FIG. 4E) and cooling air 80 is applied the shrink sleeve member (e.g., by moving the loading station 60 to a location at which cooling air is fed into the frame 62 and flows upward and out of top openings in the frame 62). The further raised position of the tubular member helps to enhance the cooling, while at the same time the lower end of the tubular member still surrounds the upper end of the screw set to maintain the upright orientation of the screw set. After cooling, the tubular member 68 is lifted further to a position separated from the screw set (per FIG. 4F) so that the wrapped screw bunch can be placed onto a conveyor 82 to move the wrapped screw bunch to a location for further heating 84 (per FIG. 4G, e.g., by passing through another heating tunnel) and further cooling 86 (per FIG. 4H, e.g., by passing by another cooling air station). The wrapped screw bunch can then be conveyed and dropped into a box, tub or bucket for packaging.

Figure 5C:
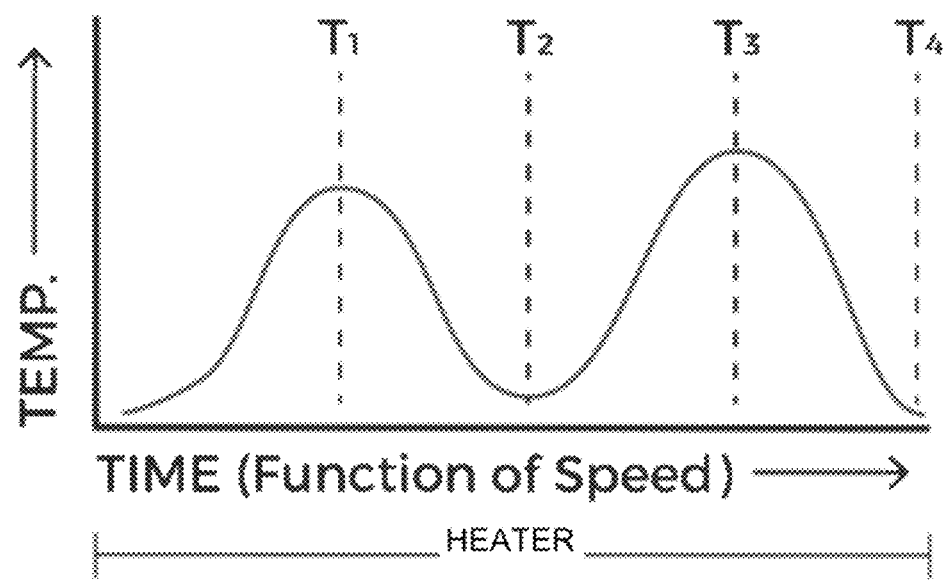
FIG. 5C shows an exemplary temperature variation.

Use of the secondary heating operation has been found to provide a more tightly wrapped screw bunch, which helps assure the screws remain in the wrapped bunch during shipping. FIG. 5A schematically depicts an implementation in which the first or primary heating step 90 and the secondary heating step 92 take place in distinct locations (e.g., different heating tunnels 90-1 and 92-1 separated by a cooling station 94). FIG. 5B schematically depicts an implementation in which the primary heating step 90 and the secondary heating step 92 take place in a common heating tunnel 90-3 that also includes cooling zones 96, 98 therein. In the latter regard, FIG. 5C reflects that various heating profiles could be applied as desired. Other variations are possible.

Figure 6:
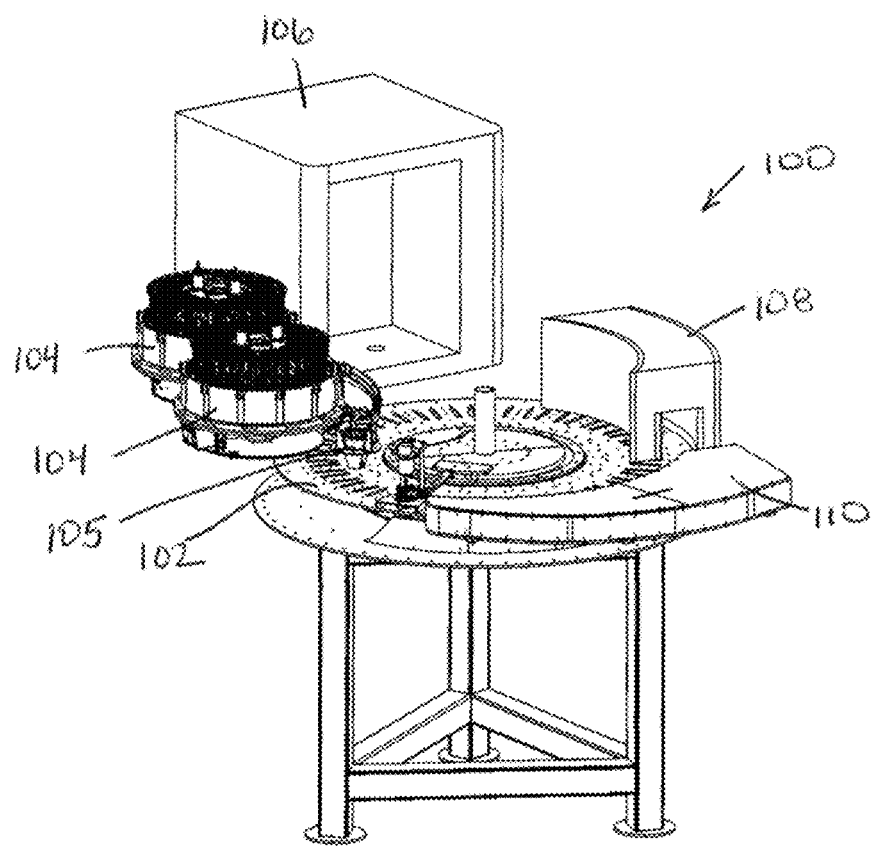
FIG. 6 shows one embodiment of a system for producing wrapped screw bunches.
Figure 7:
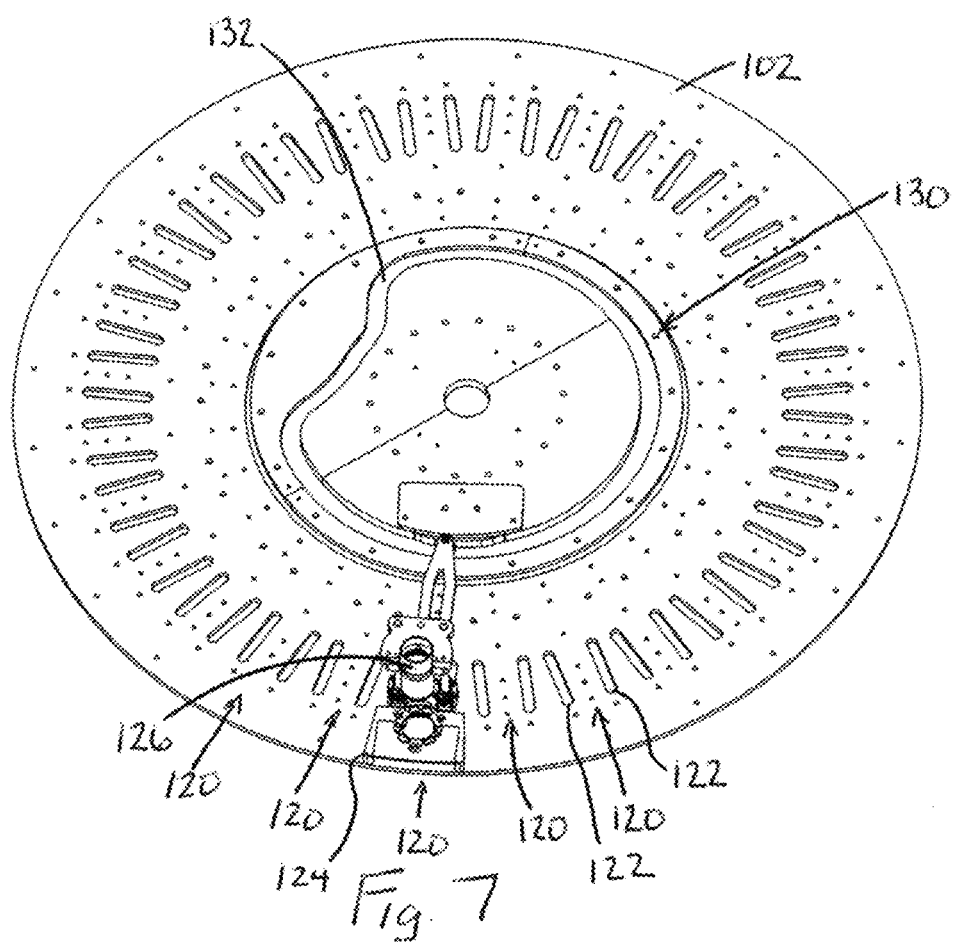
FIGS. 7 and 8 show partial perspectives of a turntable and tube lift assembly.
Figure 8:
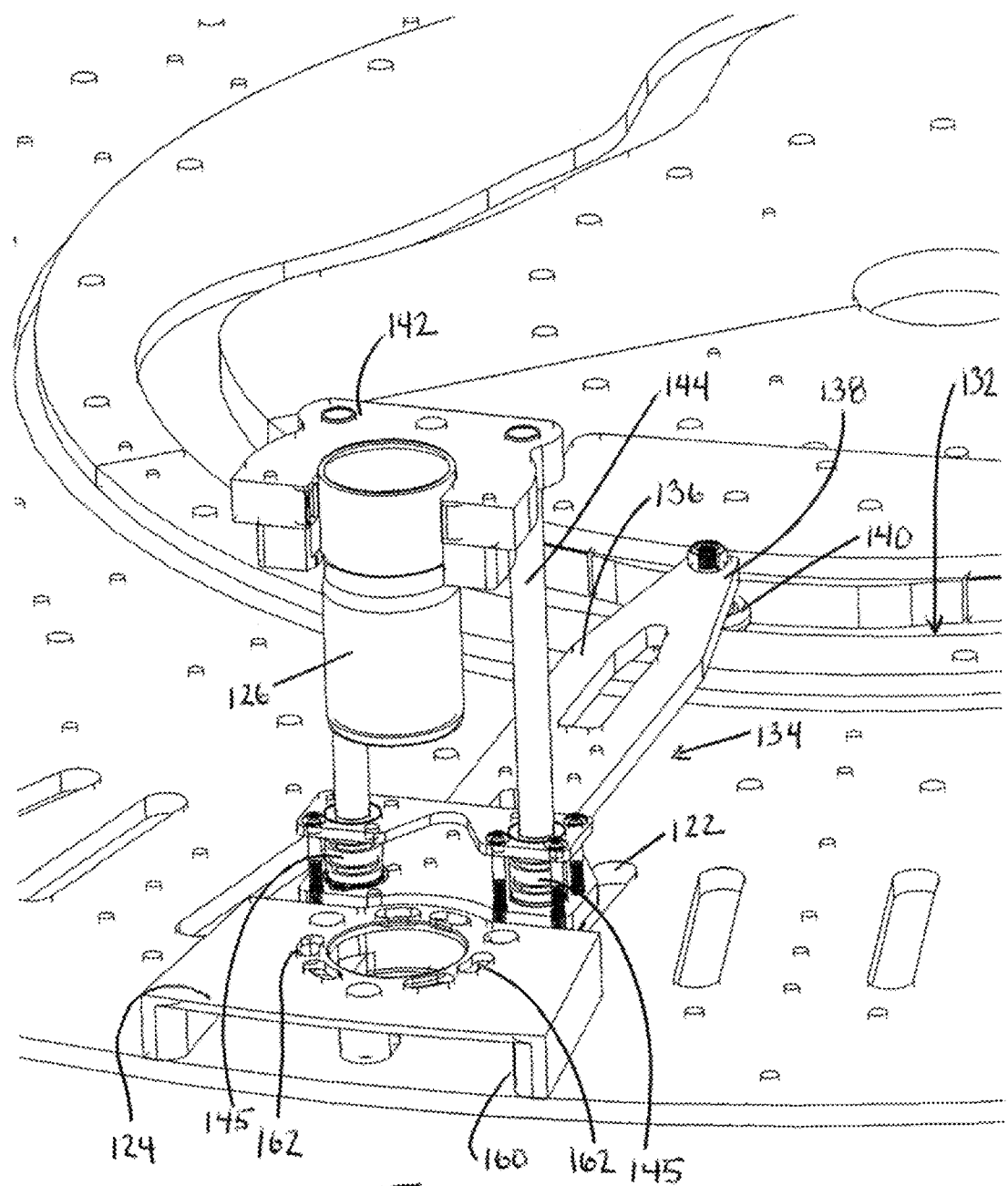

Referring now to FIG. 6, one embodiment of a system 100 for producing wrapped screw bunches is partially shown. The system 100 includes a rotatable station turntable 102 that includes a plurality of loading stations, one or more rotatable carousels 104 that feed screw groups/sets to respective drop funnels 105, a shrink sleeve applying machine 106 for applying the shrink sleeve bands, a heating tunnel 108 for applying heat to the banded screw sets and a cooling air flow duct 110.

Figure 9:
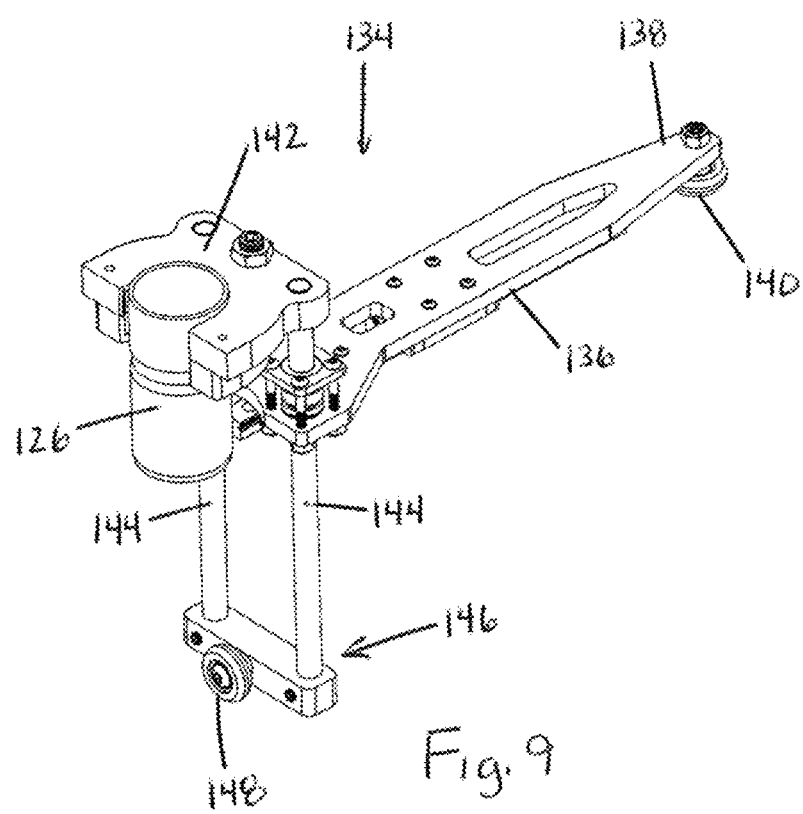
FIGS. 9 and 10 show perspectives of a tube lift assembly.
Figure 10:
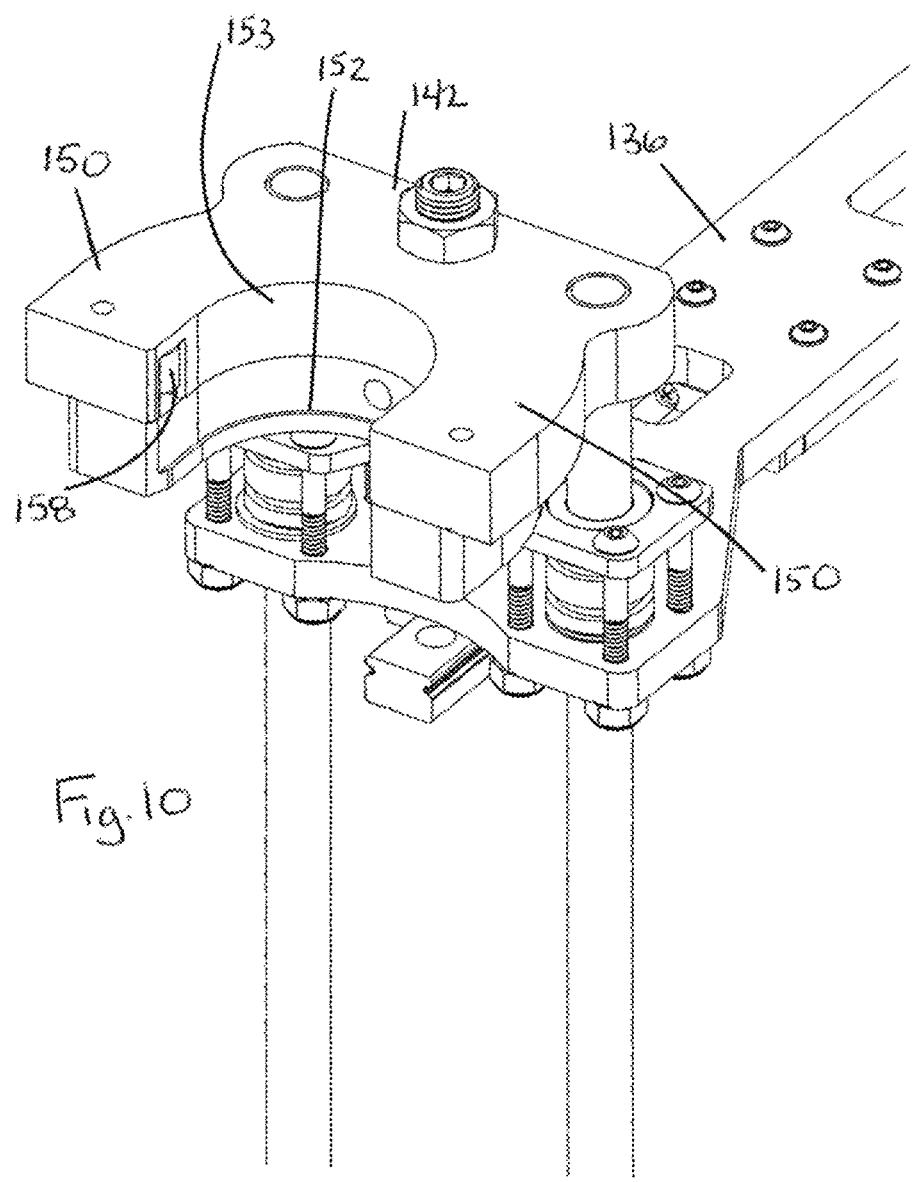
Figure 11:
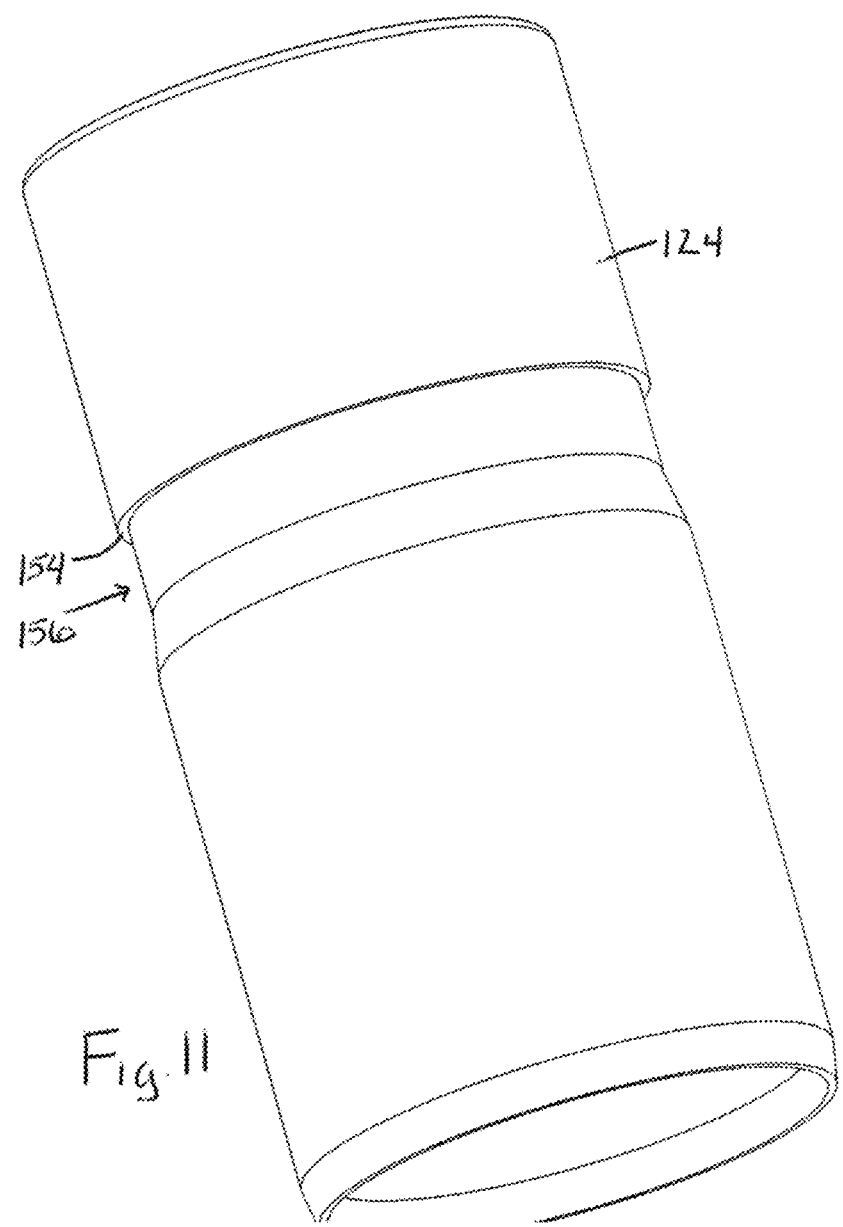
FIG. 11 shows a tubular member.

As seen in FIGS. 7-11, the turntable 102 includes a plurality of loading stations 120, each of which has an associated pair of parallel through slots 122. Here, only one loading station includes a support frame 124 and associated tubular member 126, but it is recognized that some (e.g., every other) or all of the other stations would also include those components. The turntable 102 is ring-shaped and disposed around a stationary cam plate 130 that defines a recessed cam slot 132. The loading station includes a tube lift assembly 134 that includes a guide arm 136 with an inner end 138 carrying a cam wheel roller 140 that rides in the cam slot 132, an upper lift bracket 142 that can engage and support the tubular member 126 and a lower portion 146 below the turntable 102. The lift bracket 142 is connected to spaced apart rods/bars 144 that extend down through the slots and that can move both up and down through the slots (within respective bushings 145) and along the length of the slots. The interaction of the cam roller 140 and the cam slot 132 causes the movement along the length of the slots. As seen in FIG. 9, the lower portion 146 includes a supporting roller wheel 148 that can ride on a surface below the turntable 102 to cause the upward and downward movement of the rods 144 and lift bracket 142. In the illustrated embodiment, the lift bracket 142 is U-shaped, with spaced apart arms 150 that define a slot 153 to receive the tubular member, and the bracket also defines a shelf surface 152 that can engage with a downwardly facing rim 154 formed by a recessed external surface portion 156 of the tubular member 124 in order to vertically support the tubular member 124. The end portion of each arm 150 includes a grip member 158 facing into the slot 153 so that the grip members 158 can contact the tubular member and provide a holding force to retain the tubular member against falling away and out of the open end of the slot 153. In one example, the grip member 158 can be rubber plugs that extend partially into the slot and frictionally engage the external surface of the tubular member, but other variations are possible.

Referring again to FIG. 8, a side opening 160 in the frame 124 provides an entry point for the cooling air, and the cooling air will exit upwardly through openings 162 in the upper surface of the frame 124 so as to be directed onto a wrapped screw bunch (not shown).

Figure 12:
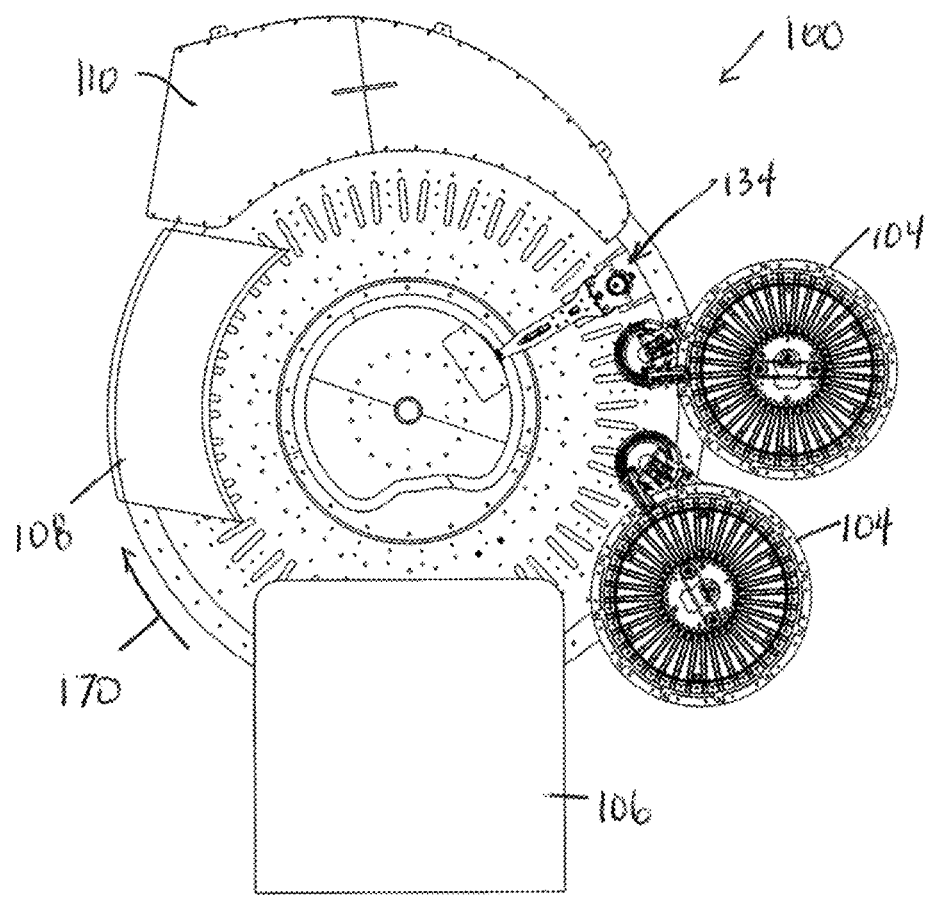
FIGS. 12-16 depict a rotation sequence of the turntable to produce a wrapped screw bunch.
Figure 13:
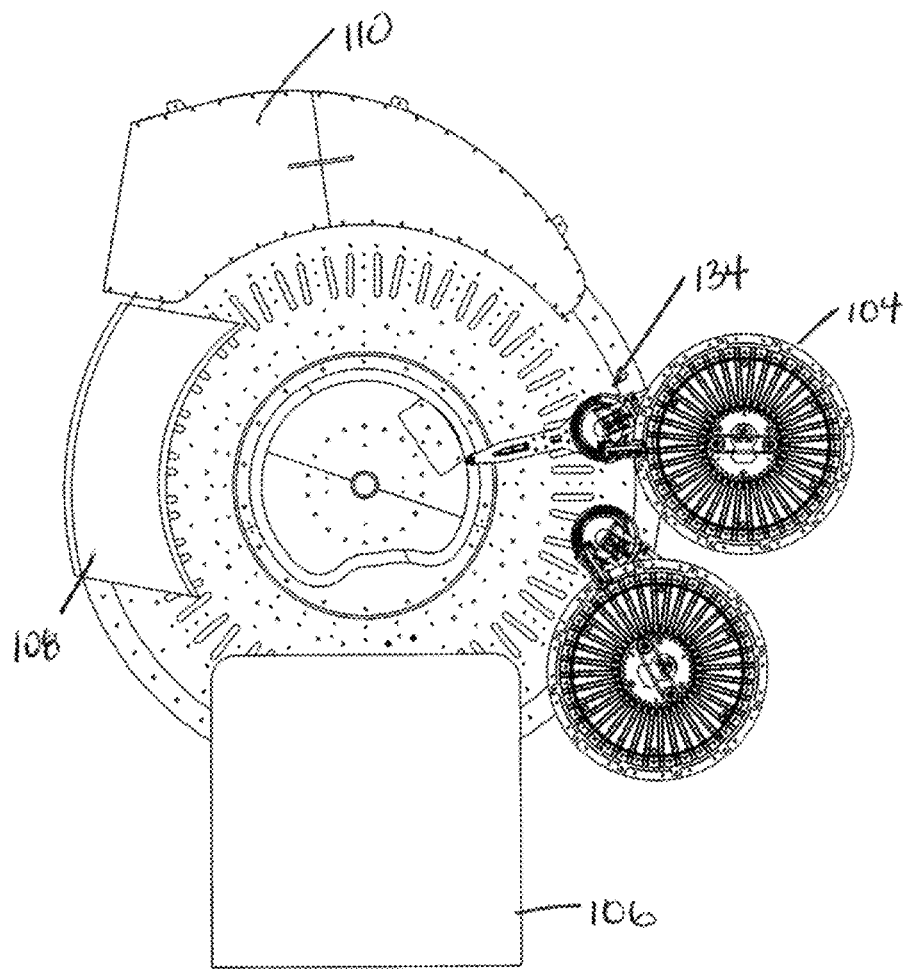

Referring now to FIGS. 12-16, a sequence of system operation, with rotation of the turntable 102 in the clockwise direction 170 is shown. In the position of FIG. 12, a tube lift assembly 134 of a loading station is upstream of a carousel 104. In FIG. 13, the tube lift assembly is rotated to a location beneath a drop funnel associated with the first carousel 104 (so that the screws can be dropped into the tubular member).

Figure 14:
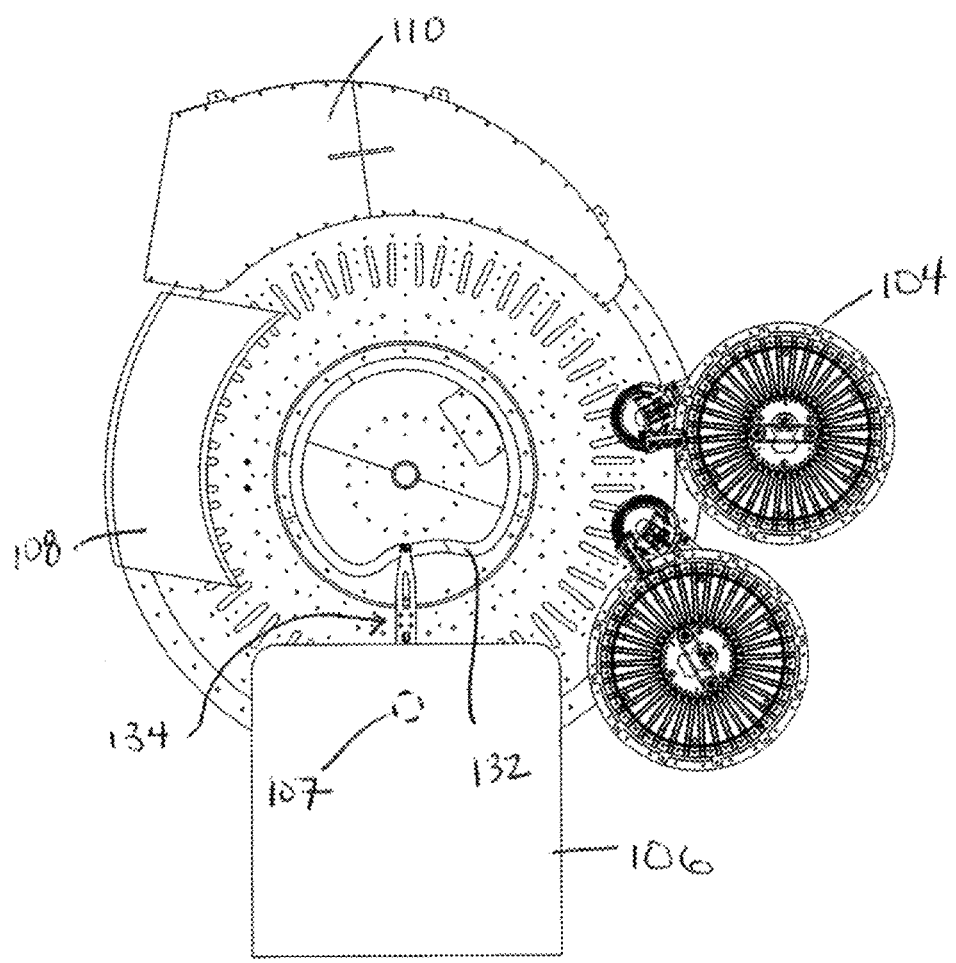
Figure 15:
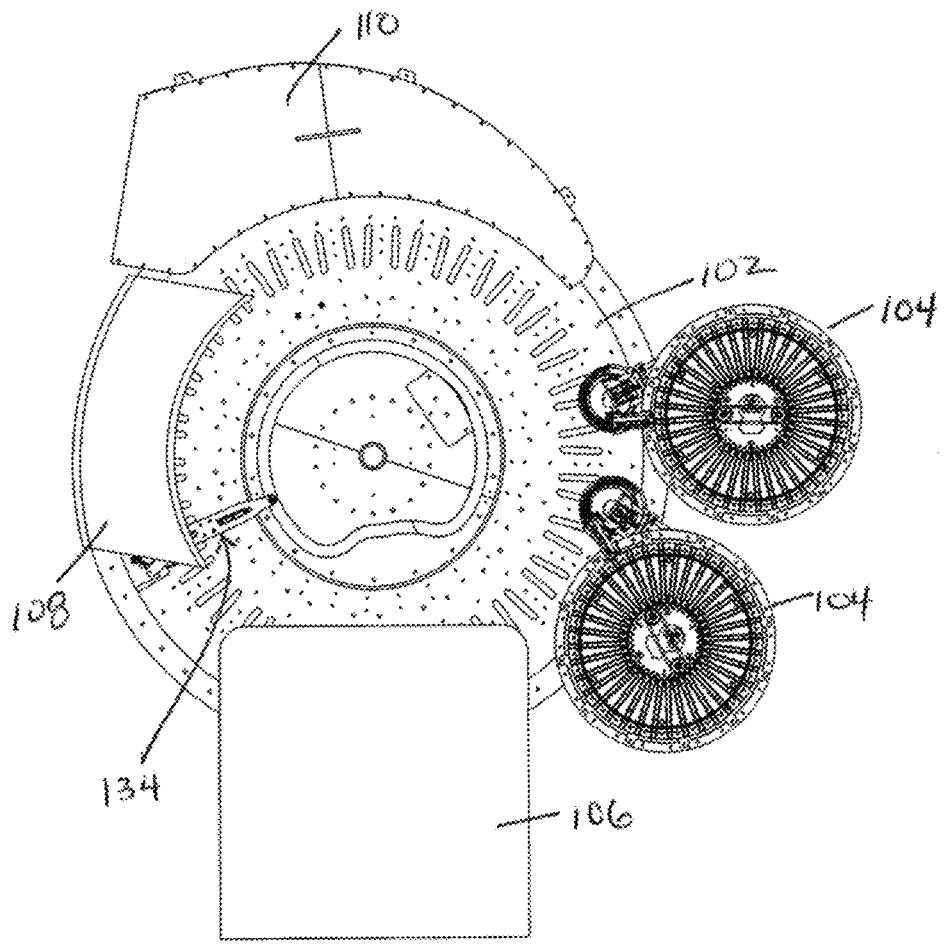
Figure 16:
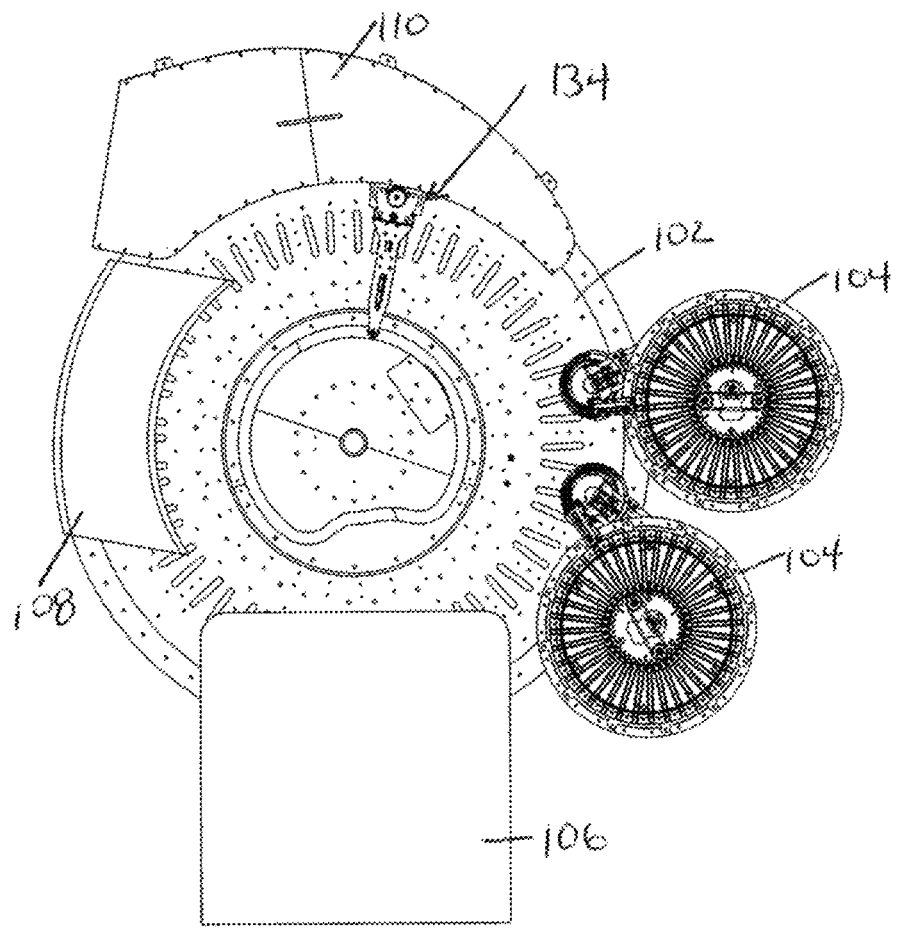

In the position of FIG. 14, the tube lift assembly is now positioned below the sleeve applying machine 106, which includes an associated drop point 107 for the tubular bands. Notably, the cam slot 132 extends inward in this region of turntable rotation so that the tube lift assembly, including the lift bracket, will be pulled away from the tubular member of the load station so as to not interfere with the application of the shrink wrap band about the tubular member. As the turntable continues to rotate toward the heating tunnel 108, the cam slot extends back outward so that the tube lift bracket will engage with the tubular member to facilitate lifting of the tubular member as the loading station moves through the heating tunnel 108. FIG. 15 shows the turntable 102 rotated to a position in which the tube lift assembly 134 aligns with the entry of the heating tunnel 108, and FIG. 16 shows a position in which the turntable 102 is rotated to a position in which the tube lift assembly 134 is in the region of the cooling air flow duct 110, which includes one or more radially inwardly facing slots to align with the loading station frame side opening 160 (FIG. 8) and deliver the cooling air for cooling.

Figure 17:
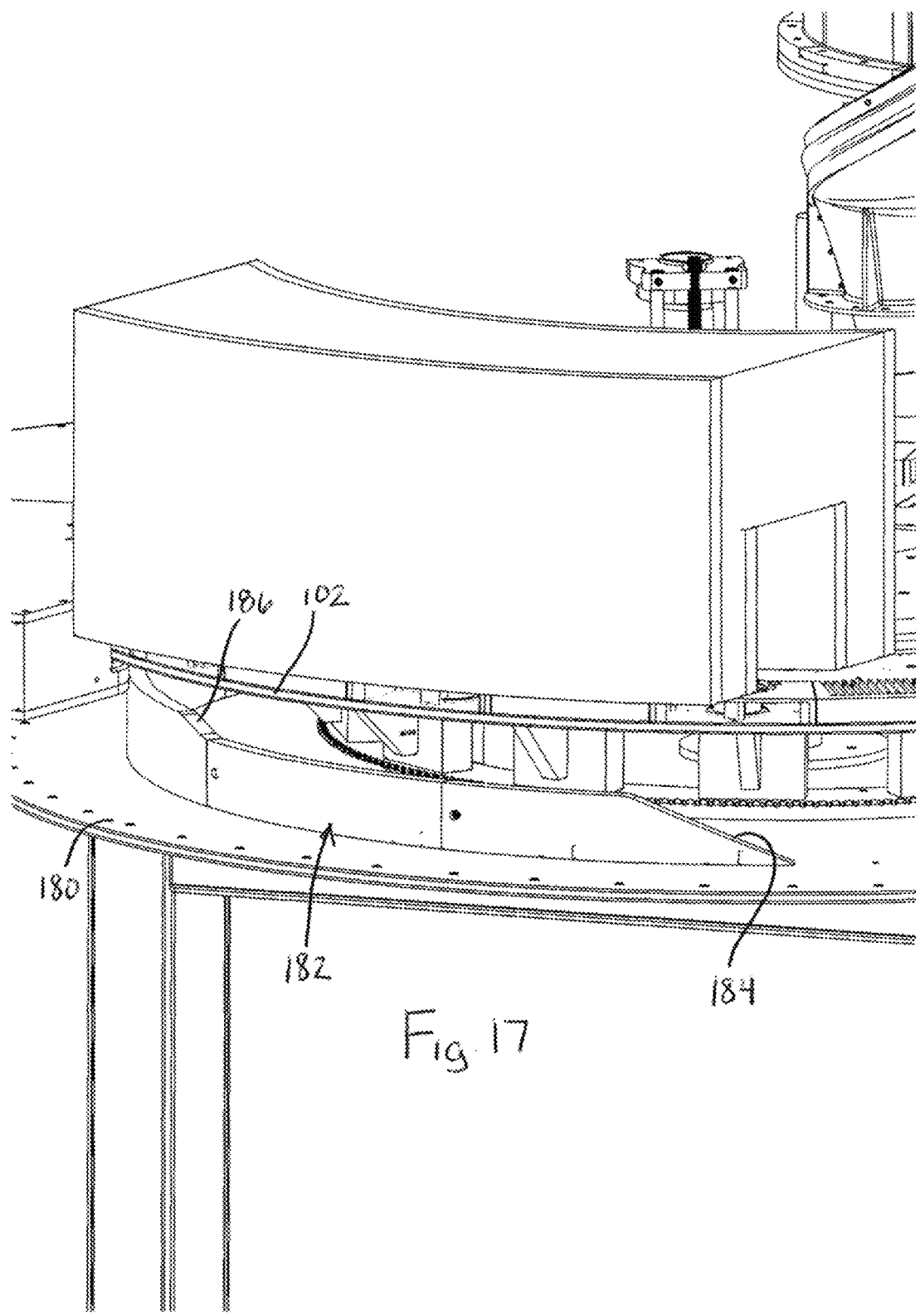
FIGS. 17 and 18 show partial perspectives of the system.
Figure 18:
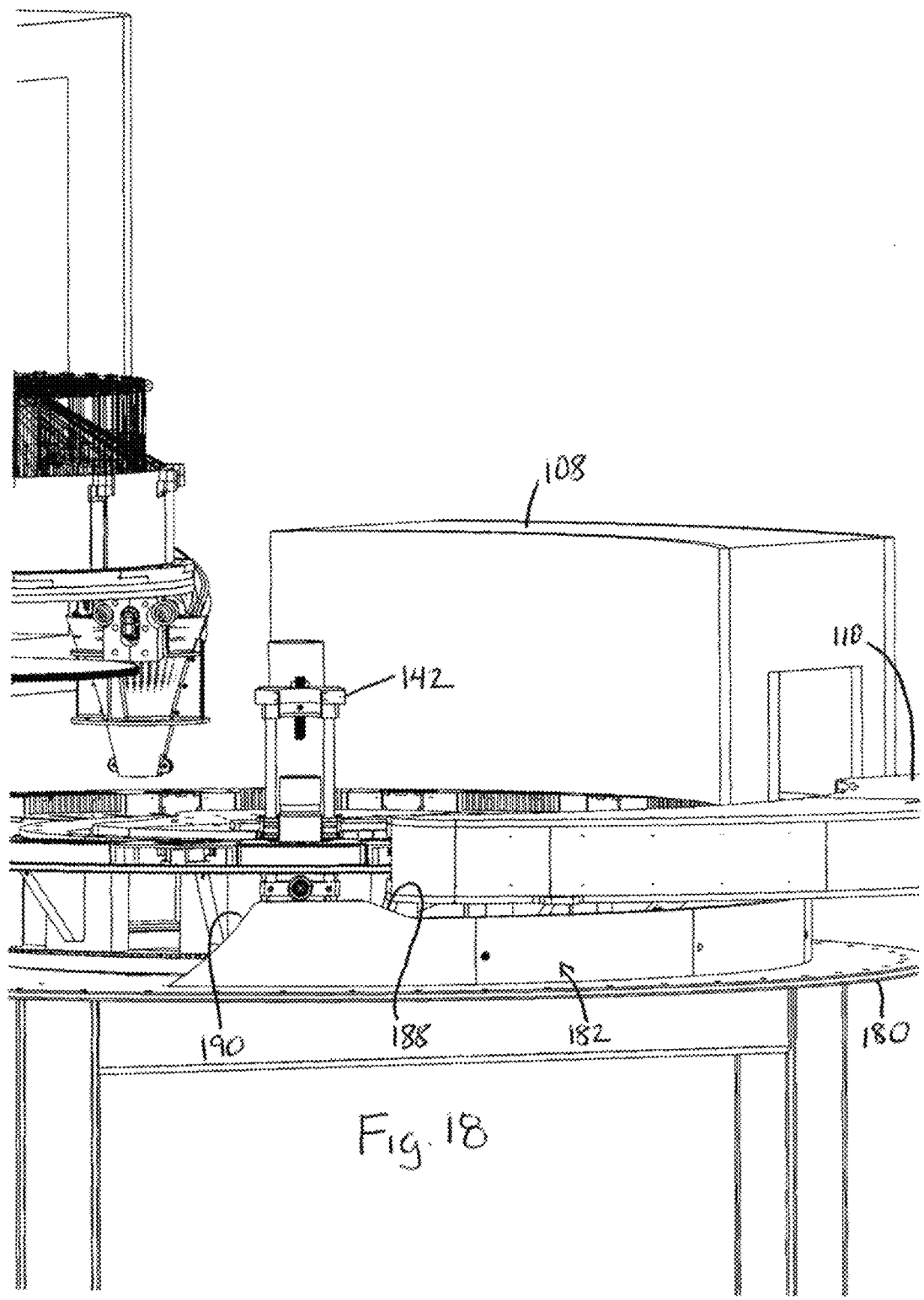

As seen in FIG. 17, the turntable 102 is positioned above a stationary plate 180. The lower roller 148 (FIG. 9) of the tube lift assembly normally rides along the upper surface of the plate, and when in such position, the tubular member 126 will be in its lowered position (e.g., comparable to 4A of FIG. 4). However, a rail structure 182 is located on the plate 180 and is located with a ramp surface 184 that will interact with the lower wheel 148, causing the lift bracket 142 is rise and lift the tubular member into a raised position suitable to expose the screws and shrink wrap band for heating (e.g., comparable to 4D) of FIG. 4). The rail structure 182 includes a further ramp surface 186 to cause the lift bracket to be further raised for the cooling operation (e.g., into a position comparable to 4E of FIG. 4). As seen in FIG. 18, the rail structure 182 includes a further ramp surface 188 to cause the lift bracket 142 to further raise into a position that permits removal of the wrapped screw bunch (e.g., comparable to 4F of FIG. 4). A downward ramped surface 190 causes lowering of the lift bracket 142 and associated tubular member in preparation for another sequence of rotation.

Figure 19:
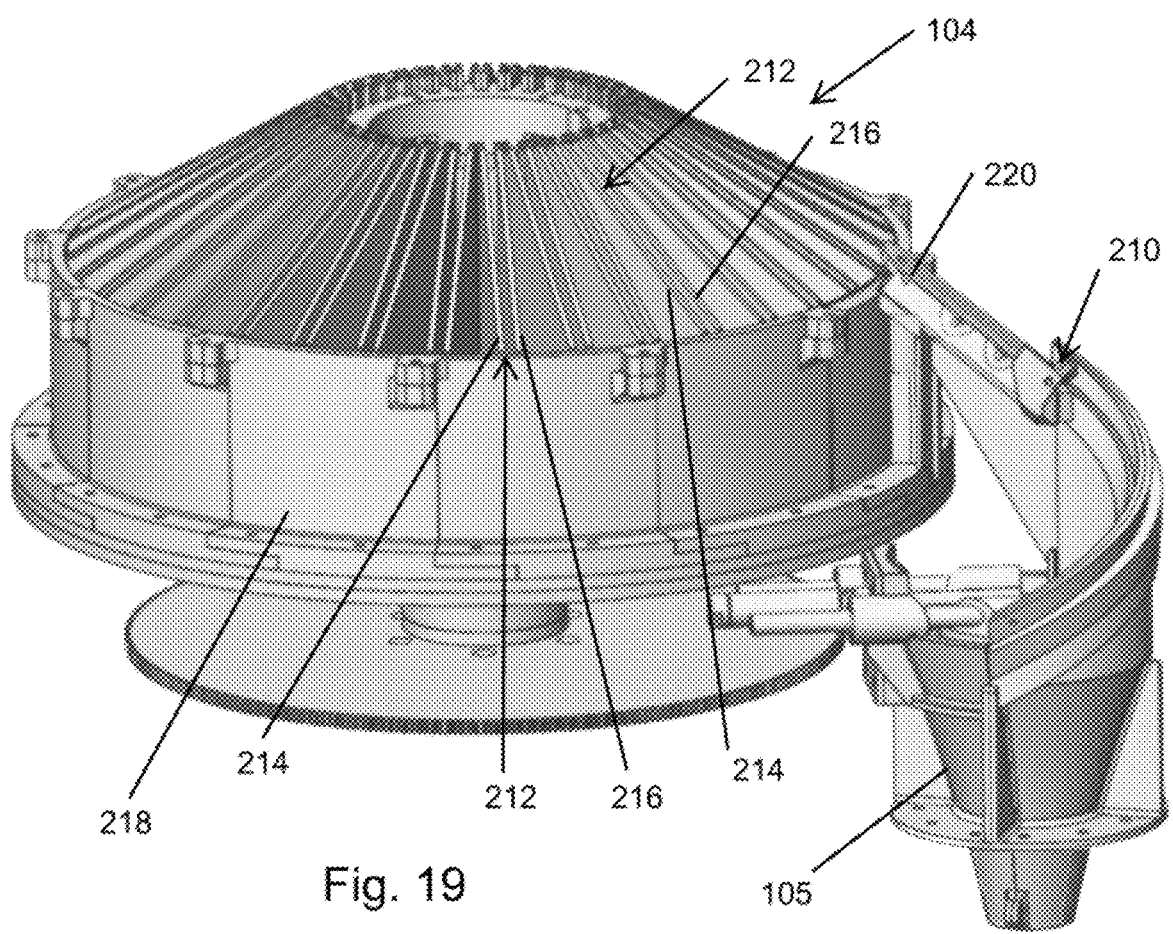
FIG. 19 shows a perspective of a carousel.
Figure 20:
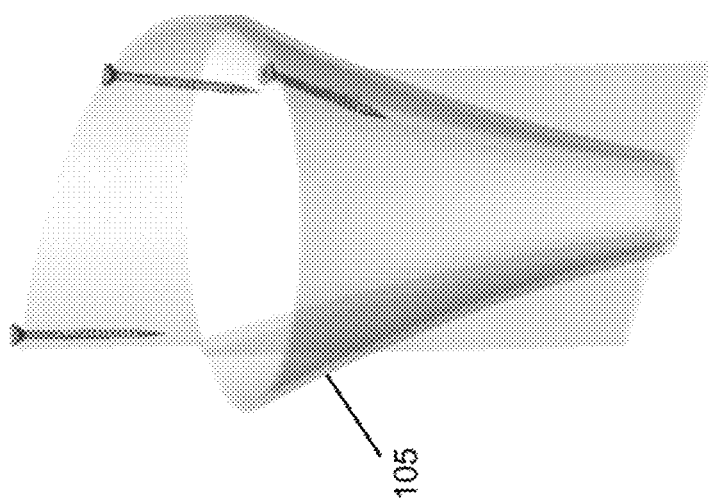
FIG. 20 depicts the spiral feed of screws to a drop funnel.
Figure 22D:
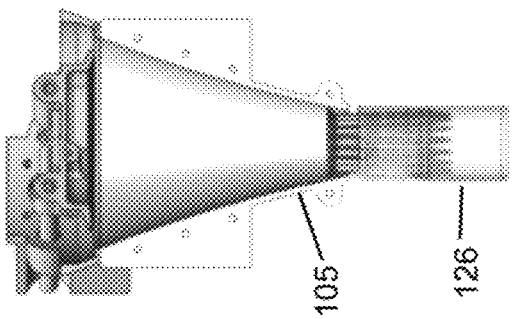
FIGS. 22A-22D show a screw drop sequence.
Figure 22C:
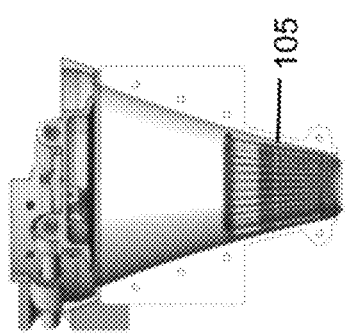
Figure 22B:
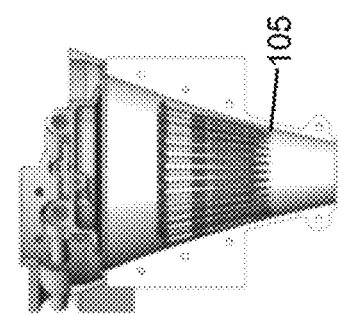
Figure 22A:
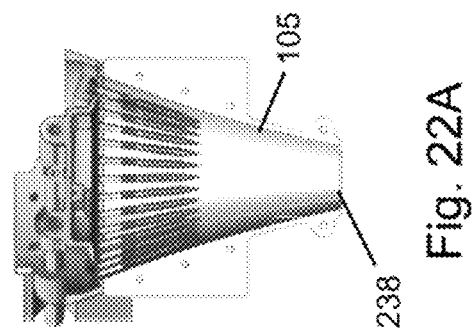

Referring now to FIG. 19, a perspective view of one embodiment of a carousel 104 with an associated drop funnel 105 and a downwardly spiraling screw feed track 210 is shown. The carousel includes a plurality of downwardly angled channels 212 formed by spaced apart plates 214, 216. The spacing between the plates is sufficient to allow the shank of the screws to extend down into the channel, but to prevent the enlarged screw head from entering the channel. In operation, sets or groups of screws are positioned within each channel 212, with the screws supported by engagement of the lower surface of the screw heads with the upper edges of the plates. A stationary wall 218 is provided and has an outlet gate 220 that will selectively align with each channel by rotational position of the carousel channels 212. When a given channel 212 aligns with the gate 220, the screws in that channel slide down into the feed track 210 and toward the drop funnel. The screws are supported in the feed track 210 by the head ends, similarly as in the channels 212, and FIG. 20 depicts the downwardly spiraling path of screws along the feed track 210 toward the drop funnel 105.

Figure 21:
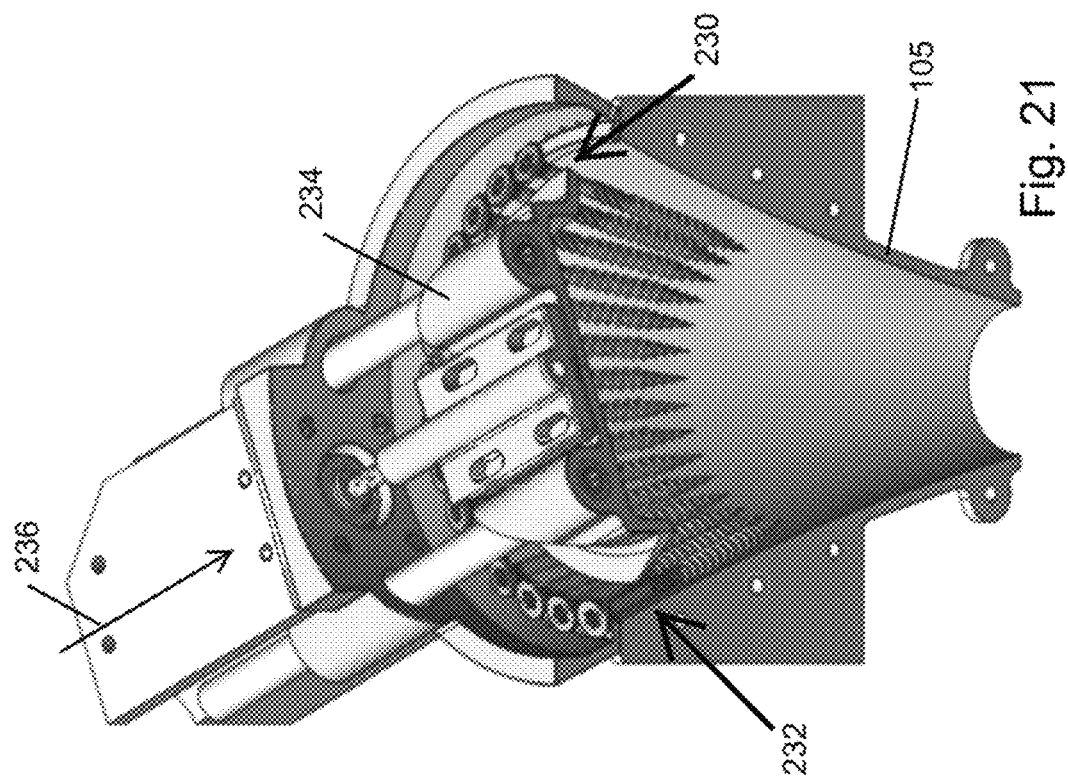
FIG. 21 depicts a section view of a drop funnel holding a screw set.

As seen in FIG. 21, the drop funnel 105 includes a support track 230 with an inlet end 232 that is aligned with the outlet end of the feed track, and the support track 230 is formed in part by a wall of the drop funnel and in part by a movable gate member 234 of the drop funnel. The gate member 234 is linearly movable (e.g., by solenoid or pneumatics) from a hold or standby position to a drop position. In the hold or standby position, the gate member 234 supports the screws by engagement with the enlarged head ends of the screws (e.g., the screws hang in the support track as shown in FIG. 21). In the drop position, the gate member 234 moves away from the enlarged head ends of the screws (e.g., in direction 236) so that the screws are no longer supported and will drop down the funnel as depicted in the sequence of FIGS. 22A-22D. As the screws drop, they move together into a tighter grouping. The drop funnel 105 includes a bottom opening 238 that is sized to assure that all dropped screws will properly enter the top opening of the tubular member 126.

Figure 23B:
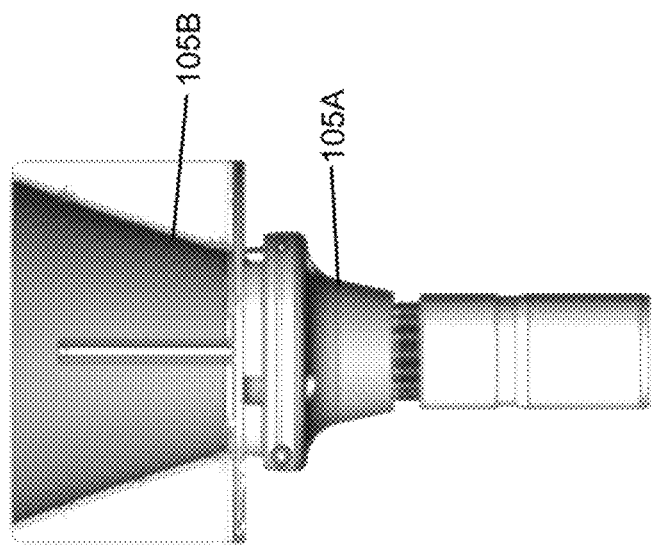
FIGS. 23A-23B show another drop funnel embodiment.
Figure 23A:
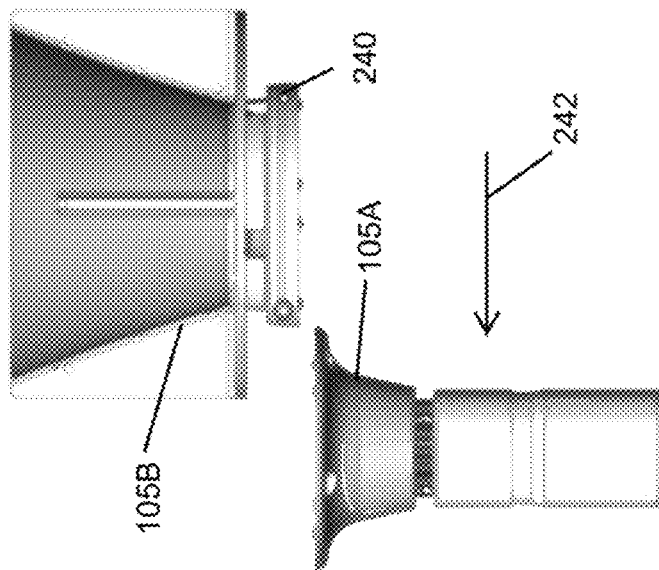

Referring to FIGS. 23A and 23B, a funnel embodiment includes a bottom portion 105A that can separate. Here, portion 105A may connect to portion 150B via a coupling 240. In one example, portion 105A is magnetically retained to the coupling 240. If the screws become jammed and do not fully drop from the funnel when the tubular member shifts (e.g., in direction 242 here), the force exerted by screws on the funnel portion 105A will cause the funnel portion 105A to also shift and separate, but without doing any permanent damage. A control of the system could detect the separation (e.g., using any suitable sensor) and shut down the operation of the system in such cases.

It is to be clearly understood that the above description is intended by way of illustration and example only, is not intended to be taken by way of limitation, and that other changes and modifications are possible. For example, while the described embodiment of the machine contemplates rollers and associated cam or ramp surfaces to achieve desired movement of the tube lift assembly, it is recognized that other variations are possible, such as the use of actuators to control the up/down movements and the in/out movements. Moreover, while the primary embodiment of the production process contemplates lifting the tubular member in order to provide a suitable relative positioning between the shrink wrap plastic band and the screws for the purpose of heat shrink, other variations are possible, such as lowering the support frame 124 rather than the tubular member, which still creates the desired spaced position between the tubular member and the support frame, exposing the screw to the shrink wrap band so that the band can shrink into contact with the screws without interference from the tubular member. Further, while the primary embodiment of the machine contemplates a rotational production line, a production line with a linear configuration could also be implemented. Such a linear configuration would provide for additional manufacturing station space, improved station volume flexibility and improved production scalability.

Still other variations and modifications are possible.

What is claimed is:

1. A screw bunch, comprising:
   a plurality of screws, each screw having an enlarged head end, a pointed tip end and shank extending between the enlarged head end and the pointed tip end, the shank being at least partially threaded,
   wherein the plurality of screws are grouped together in a bunch with the enlarged head end of each screw toward a first end of the bunch and the pointed tip end of each screw toward a second end of the bunch;
   wherein the plurality of screws are held together in the bunch by a band structure that extends around the bunch and that engages with the shanks of a multiplicity of the screws that are located along a perimeter of the bunch;

wherein the enlarged head ends of the plurality of screws are axially staggered, such that a head end perimeter dimension of the bunch is smaller than would be the case if the head ends were not axially staggered;

wherein the band structure comprises a shrink wrap plastic band that can be separated from the bunch manually to enable individual retrieval of screws from the bunch for use;

wherein the shrink wrap plastic band includes a first edge and a second edge, wherein the first edge is spaced away from the first end of the bunch such that the enlarged head end of each screw is exposed beyond the shrink wrap plastic band, wherein the second edge is spaced away from the second end of the bunch such that the pointed tip end of each screw is exposed beyond the shrink wrap plastic band;

wherein the shrink wrap plastic band includes at least one separation line formed by a set of perforations, the separation line configured to enable separation of the shrink wrap plastic band by manually gripping and pulling laterally on at least one of the enlarged head end or the pointed tip end of one of the screws to move the one of the screws away from the bunch and against the shrink wrap plastic band so as to apply sufficient force to cause the shrink wrap plastic band to split along the separation line, wherein the plurality of screws are configured such that each screw is freely separable from the other screws and the shrink wrap plastic band following split of the shrink wrap plastic band.

2. A screw package, comprising:
a container;
a plurality of screw bunches, each screw bunch according to claim 1, each screw bunch carried within the container and individually removable from the container.

3. The screw package of claim 2, further comprising:
the container including a container body and a lid.

4. A screw bunch, comprising:
a plurality of screws, each screw having an enlarged head end, a pointed tip end and shank extending between the enlarged head end and the pointed tip end, the shank being at least partially threaded, wherein the plurality of screws are grouped together in a bunch having an elongated axis, wherein the enlarged head end of each screw is located toward a first end of the bunch and the pointed tip end of each screw is located toward a second end of the bunch;

wherein the plurality of screws are held together in the bunch by a band structure that extends around the bunch and that engages with the shanks of a multiplicity of the screws that are located along a perimeter of the bunch;

wherein the enlarged head ends of the plurality of screws are axially staggered, such that the enlarged head ends of multiple screws overlap in an end view along the elongated axis and such that a head end perimeter dimension of the bunch is smaller than would be the case if the head ends were not axially staggered and overlapping;

wherein both of the enlarged head end and the pointed tip end of each screw is exposed beyond the band structure to enable manual gripping;

wherein the band structure comprises a shrink wrap plastic band that can be separated from the bunch manually to enable individual retrieval of screws from the bunch for use, wherein the shrink wrap plastic band includes at least one separation line formed by a set of perforations, the separation line configured to enable separation of the shrink wrap plastic band by manually gripping and pulling laterally on at least one of the enlarged head end or the pointed tip end of one of the screws to apply sufficient force to cause the shrink wrap plastic band to split at the separation line;

wherein each of the screws is freely removable from the bunch and the shrink wrap plastic band after split of the shrink wrap plastic band.

5. The screw bunch of claim 4, wherein the shrink wrap plastic band does not engage at least one or more screws that are located within an interior region of the bunch.

6. The screw bunch of claim 5, wherein the plurality of screws are not arranged in a single line with each other.

7. A screw bunch, comprising:
a plurality of screws, each screw having an enlarged head end, a pointed tip end and shank extending between the enlarged head end and the pointed tip end, the shank being at least partially threaded, wherein the plurality of screws are grouped together in a bunch with the enlarged head end of each screw toward a first end of the bunch and the pointed tip end of each screw toward a second end of the bunch;

wherein the plurality of screws are held together in the bunch by a band structure that extends around the bunch and that engages with the shanks of a multiplicity of the screws that are located along a perimeter of the bunch;

wherein the band structure comprises a shrink wrap plastic band that can be separated from the bunch manually to enable individual retrieval of screws from the bunch for use;

wherein the shrink wrap plastic band includes a first edge and a second edge, wherein the first edge is spaced away from the first end of the bunch such that the enlarged head end of each screw is exposed beyond the shrink wrap plastic band, wherein the second edge is spaced away from the second end of the bunch such that the pointed tip end of each screw is exposed beyond the shrink wrap plastic band;

wherein the shrink wrap plastic band includes at least one separation line formed by a set of perforations, the separation line configured to enable separation of the shrink wrap plastic band by pulling laterally on at least one of the enlarged head end or the pointed tip end of one of the screws to apply sufficient force to cause the shrink wrap plastic band to split at the separation line, wherein the plurality of screws are configured such that each screw is freely separable from the other screws and the shrink wrap plastic band following split of the shrink wrap plastic band.

* * * * *